(12) United States Patent
Botman et al.

(10) Patent No.: US 10,303,399 B2
(45) Date of Patent: May 28, 2019

(54) DATA PROCESSING APPARATUS AND METHOD FOR CONTROLLING VECTOR MEMORY ACCESSES

(71) Applicant: ARM LIMITED, Cambridge (GB)

(72) Inventors: François Christopher Jacques Botman, Cambridge (GB); Thomas Christopher Grocutt, Cambridge (GB)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 15/834,434

(22) Filed: Dec. 7, 2017

(65) Prior Publication Data
US 2018/0181347 A1    Jun. 28, 2018

(30) Foreign Application Priority Data
Dec. 22, 2016 (EP) .................................. 16206294

(51) Int. Cl.
G06F 9/30 (2018.01)
G06F 3/06 (2006.01)
G06F 9/345 (2018.01)

(52) U.S. Cl.
CPC ............ G06F 3/0659 (2013.01); G06F 3/061 (2013.01); G06F 3/0673 (2013.01);
(Continued)

(58) Field of Classification Search
CPC .... G06F 9/30105; G06F 9/30109; G06F 9/34; G06F 9/342; G06F 9/345; G06F 9/30181; G06F 9/30189
See application file for complete search history.

(56) References Cited

U.S. PATENT DOCUMENTS 7,219,212 B1 * 5/2007 Sanghavi ............ G06F 9/30021
712/225
2010/0106944 A1   4/2010 Symes et al.
(Continued)

OTHER PUBLICATIONS

Extended Search Report for EP16206294.7 dated Jul. 7, 2017, 5 pages.

*Primary Examiner* — Midys Rojas
*Assistant Examiner* — Khoa D Doan
(74) *Attorney, Agent, or Firm* — Nixon & Vanderhye P.C.

(57) ABSTRACT

An apparatus and method are provided for controlling vector memory accesses. The apparatus comprises a set of vector registers, and flag setting circuitry that is 5 responsive to a determination that a vector generated for storage in one of the vector registers comprises a plurality of elements that meet specified contiguousness criteria, to generate flag information associated with that vector register. Processing circuitry is then used to perform a vector memory access operation in order to access in memory a plurality of data values at addresses determined from an address vector operand 10 comprising a plurality of address elements. The address vector operand is provided in a specified vector register of the vector register set, such that the plurality of elements of the vector stored in that specified vector register form the plurality of address elements. The processing circuitry is arranged to determine whether the specified vector register has flag information associated therewith, and if it does, then that flag information is 15 used when determining a number of accesses to memory required to access the plurality of data values. This provides an efficient mechanism for allowing gather or scatter type memory access operations to be implemented using a reduced number of accesses to memory in certain situations where the flag information has been generated for the associated address vector operand.

18 Claims, 22 Drawing Sheets

(52) U.S. Cl.
CPC ...... *G06F 9/30036* (2013.01); *G06F 9/30043* (2013.01); *G06F 9/30181* (2013.01); *G06F 9/30189* (2013.01); *G06F 9/345* (2013.01)

(56) References Cited

U.S. PATENT DOCUMENTS

| | | |
|---|---|---|
| 2013/0326160 A1 | 12/2013 | Sperber et al. |
| 2015/0032929 A1* | 1/2015 | Zamsky ................. G06F 13/16 710/305 |
| 2015/0227367 A1 | 8/2015 | Eyole-Monono et al. |
| 2017/0031865 A1* | 2/2017 | Eyole ................. G06F 15/8076 |

* cited by examiner

```
VLDR  Q1, [R0], #16
VMUL  Q0, Q1, Q2
VSHR  Q0, Q0, #1
```

DATA PROCESSING APPARATUS AND METHOD FOR CONTROLLING VECTOR MEMORY ACCESSES

This application claims priority to EP Patent Application No. 16206294.7 filed Dec. 22, 2016, the entire contents of which are hereby incorporated by reference.

BACKGROUND

The present technique relates to the field of data processing. More particularly, it relates to the processing of vector instructions.

Some data processing systems support processing of vector instructions for which a source operand or result value of the instruction is a vector comprising multiple elements. By supporting the processing of a number of distinct elements in response to a single instruction, code density can be improved and the overhead of fetching and decoding of instructions reduced. An array of data values to be processed can be processed more efficiently by loading the data values into respective elements of a vector operand and processing the data values several elements at a time using a single vector instruction.

One type of vector memory access operation that can be performed accesses a plurality of data values in memory at addresses determined from an address vector operand comprising a plurality of address elements. Such operations provide a great deal of flexibility as they allow data values to be accessed from arbitrary memory locations, with the address of each data value being derived from a corresponding address element in the address vector operand. When loading data values from memory into a vector register, such memory access operations are often referred to as gather memory access operations, as they serve to gather data values from a plurality of address locations and store those data values within a vector register. Similarly, when such operations are used to store data values from a vector register into memory, they are often referred to as scatter memory access operations, as they serve to distribute the data values from a vector register to the identified addresses in memory.

Due to the fact that the addresses involved in such gather or scatter operations can be arbitrary, the processing of such operations typically requires the various access requests to be serialised, such that a series of independent load or store operations are performed. Seeking to do otherwise would come at a significant cost in terms of hardware and thus area and power, and would require additional processing to be performed in a critical timing path, namely the memory access path.

It would be desirable to provide an improved mechanism for handling gather or scatter operations without such additional hardware costs, and without impacting on the timing path to memory.

SUMMARY

In some examples, a data processing apparatus is provided comprising: a set of vector registers; flag setting circuitry, responsive to a determination that a vector generated for storage in a vector register of said set comprises a plurality of elements that meet specified contiguousness criteria, to generate flag information associated with that vector register; and processing circuitry to perform a vector memory access operation in order to access in memory a plurality of data values at addresses determined from an address vector operand comprising a plurality of address elements, said address vector operand being provided in a specified vector register of said set, and the plurality of elements of the vector stored in said specified vector register forming said plurality of address elements; the processing circuitry being arranged to determine whether said specified vector register has flag information associated therewith and, when the first vector register does have flag information associated therewith, to use the flag information when determining a number of accesses to memory required to access the plurality of data values.

Other examples provide a method of controlling vector memory accesses in a data processing apparatus having a set of vector registers, comprising: determining whether a vector generated for storage in a vector register of said set comprises a plurality of elements that meet specified contiguousness criteria; generating, in response to determining that said vector does comprise a plurality of elements that meet the specified contiguousness criteria, flag information associated with said vector register; performing vector memory access operation in order to access in memory a plurality of data values at addresses determined from an address vector operand comprising a plurality of address elements, said address vector operand being provided in a specified vector register of said set, and the plurality of elements of the vector stored in said specified vector register forming said plurality of address elements; and when performing the memory access operation, determining whether said specified vector register has flag information associated therewith and, when the first vector register does have flag information associated therewith, using the flag information when determining a number of accesses to memory required to access the plurality of data values.

Yet further examples provide a data processing apparatus comprising: a set of vector registers; flag setting means for generating, responsive to a determination that a vector generated for storage in a vector register of said set comprises a plurality of elements that meet specified contiguousness criteria, flag information associated with that vector register; and processing means for performing a vector memory access operation in order to access in memory a plurality of data values at addresses determined from an address vector operand comprising a plurality of address elements, said address vector operand being provided in a specified vector register of said set, and the plurality of elements of the vector stored in said specified vector register forming said plurality of address elements; the processing means for determining whether said specified vector register has flag information associated therewith and, when the first vector register does have flag information associated therewith, for using the flag information when determining a number of accesses to memory required to access the plurality of data values.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Figure 1:
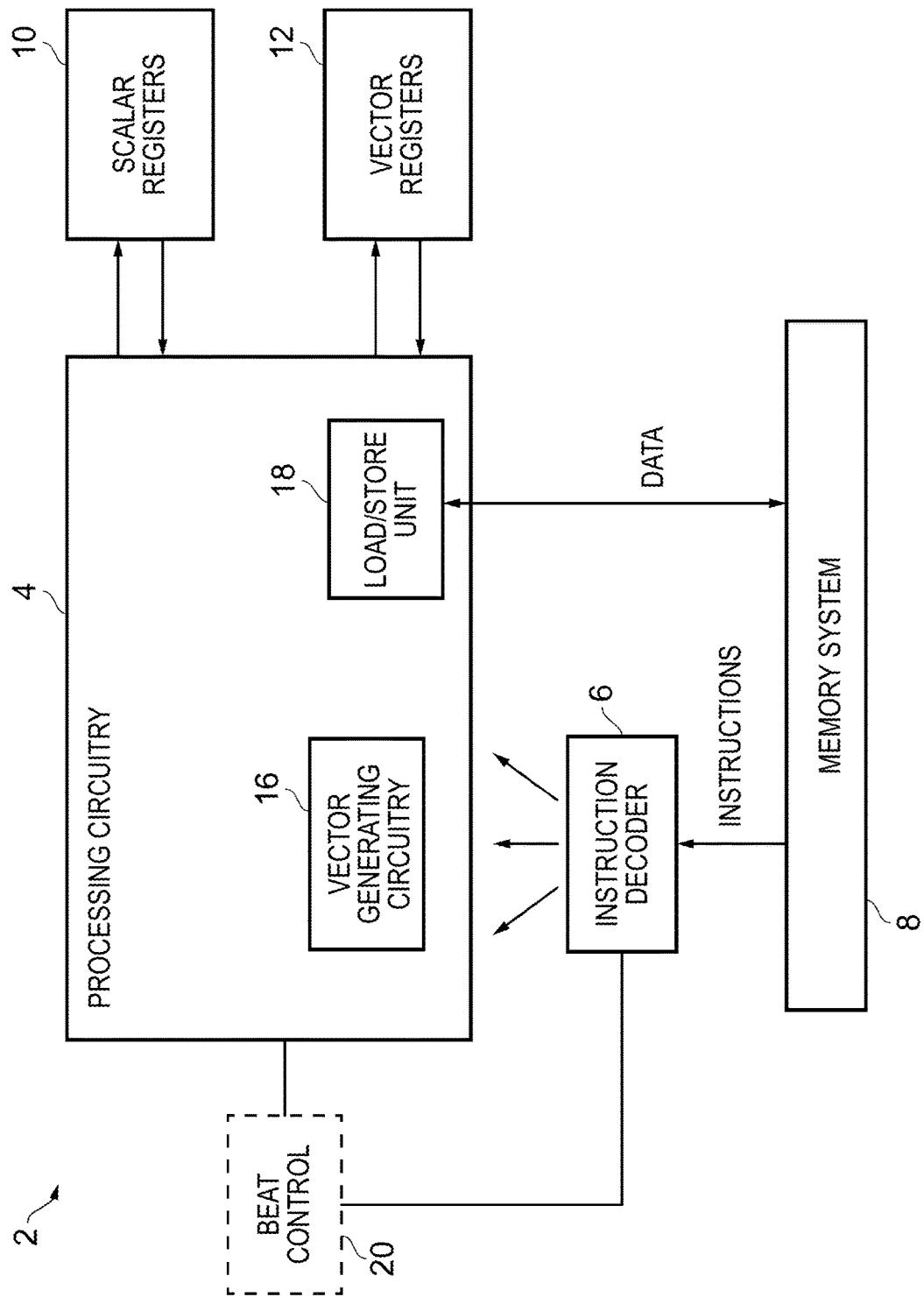
FIG. 1 is a block diagram of an apparatus in accordance with one embodiment.

Before discussing the embodiments with reference to the accompanying figures, the following description of embodiments is provided.

As mentioned earlier, it typically proves necessary to serialise the various accesses associated with scatter or gather type memory access operations, due to the fact that the addresses to process in accordance with such operations can be arbitrary with respect to each other. In the cases where the accesses are indeed arbitrary, this is reasonable and necessary. However, the inventors realised that there are an increasing number of cases where such scatter or gather type memory access operations are used, but where at least some of the addresses to be accessed are in fact consecutive and accordingly multiple of the data values could be accessed via a single access to contiguous addresses in the memory. However, in vector processing systems the access path to memory is often a critical timing path, and accordingly in such situations providing circuitry within the memory access path to analyse the addresses at the time the vector memory access operation is to be processed can cause timing issues or comes at a high hardware cost.

The described embodiments provide a mechanism for alleviating this problem. In particular, a data processing apparatus is provided that comprises a set of vector registers, and flag setting circuitry that is responsive to a determination that a vector generated for storage in one of those vector registers comprises a plurality of elements that meet specified contiguousness criteria, to generate flag information associated with that vector register. The data processing apparatus further has processing circuitry to perform a vector memory access operation in order to access in memory a plurality of data values at addresses determined from an address vector operand comprising a plurality of address elements. The address vector operand is provided in a specified vector register of the set, such that the plurality of elements of the vector stored in that specified vector register form the plurality of address elements. The processing circuitry is arranged to determine whether the specified vector register has flag information associated therewith. If it does, then that flag information is used by the processing circuitry when performing the vector memory access operation in order to determine a number of accesses to memory required to access the plurality of data values.

By such an approach, the flag setting circuitry can generate flag information during a time period that is off the critical path, and in particular the flag information may be generated prior to the vector memory access operation being performed. Accordingly, at the time the vector memory access operation is performed, the processing circuitry can merely determine whether there is flag information present or not for the vector register in question, and if there is then that flag information can be used to potentially reduce the number of accesses to memory required. In particular, if the flag information indicates that one or more of the addresses derived from the address elements are in fact contiguous, then a single access to those contiguous addresses may be able to be performed, thereby reducing the overall number of accesses required to process the vector memory access operation, and hence increasing performance.

In one embodiment, in the absence of said flag information being associated with the specified vector register, the processing circuitry is arranged to treat each data value as having a discontiguous address in the memory when determining the number of accesses to memory required to access the plurality of data values. Alternatively, in other embodiments, the apparatus may include one or more other components that can seek to at least partially optimise the accesses even in the absence of the flag information. Accordingly, the technique of the described embodiments, employing the use of the flag setting circuitry to generate flag information, can if desired be used in combination with one or more other techniques that also seek to optimise accesses to memory.

The specified contiguousness criteria that the flag setting circuitry checks for when reviewing the plurality of elements of a vector can take a variety of forms. However, in one embodiment, the specified contiguousness criteria requires at least a subset of the elements in the vector to have values that follow a regularly progressing sequence, and the flag information enables the processing circuitry to determine which elements in the vector have values that follow the regularly progressing sequence.

In one embodiment, the regularly progressing sequence of the element values is such that contiguous memory addresses will result from the use of those element values when those elements are used as address elements for the memory access operation.

In one embodiment, the size of the data values accessed may be fixed, but in other embodiments the memory access operations may be able to be used to access data values of a variety of different sizes. Whether the element values follow a regularly progressing sequence may hence depend on the size of the data values that are intended to be accessed using those elements as address elements for the memory access operation.

In one such embodiment, the flag information may comprise size information identifying a data value size for which the elements in the vector having values that follow the regularly progressing sequence will generate contiguous addresses in memory when those elements are used as the address elements for the vector memory access operation.

The flag information can take a variety of forms, provided it enables the processing circuitry to determine which elements in the vector have values that follow the regularly progressing sequence. In one embodiment, the flag information comprises at least one valid flag, each valid flag associated with a portion of the vector, and each valid flag being set when the elements within the associated portion of the vector have values that follow the regularly progressing sequence. Hence, the number of valid flags provided within the flag information can be varied dependent on implementation, thus enabling the granularity with which the specified contiguousness criteria is assessed within the vector to be varied as desired.

A decision as to the number of valid flags to be provided within the flag information can be taken dependent on a variety of factors relevant to the particular implementation of the data processing apparatus being considered. For instance, one factor that may be considered is the available bandwidth for accesses to memory. For example, if the vectors are 128-bit vectors, but the access path to memory is 64 bits wide, then it may be appropriate to provide two valid flags, one associated with each 64-bit portion of the vector.

In embodiments where it is decided to provide multiple valid flags within the flag information, then if desired the flag information can further identify, when multiple adjacent portions of the vector have their valid flags set, whether there is a continuity in the regularly progressing sequence between the multiple adjacent portions. This could for instance be useful where the memory access bandwidth is a multiple of the number of bits of the vector associated with each valid flag. For example, if a separate valid flag was provided for each 32-bit portion within a 128-bit vector, and the memory access bandwidth was 64 bits, it may be useful to know whether two adjacent portions that have their valid flags set, hence indicating that those individual 32-bit portions have elements whose values follow a regularly progressing sequence, are also arranged so that there is a continuity in the regularly progressing sequence between those two adjacent portions. This could for example enable a single 64-bit contiguous access to be performed using the address elements from those two portions.

However, in some embodiments it may be determined that only a single valid flag is required. In particular, in that instance the specified contiguousness criteria may require all of the elements in the vector to have values that follow the regularly progressing sequence, and the flag information comprises a valid flag set when all of the elements in the vector have values that follow the regularly progressing sequence. Such an approach can reduce the amount of storage required to maintain the flag information.

The flag information itself can be stored in a variety of ways. In one embodiment, the data processing apparatus further comprises a control storage in which the flag information is stored for reference by the processing circuitry.

In some embodiments, the use of the flag information can be constrained so that the flag setting circuitry only considers vectors written into one or more specific registers. In such instances, it may be predetermined which register any particular item of flag information pertains to, hence not requiring the register to specifically be identified. However, in an alternative embodiment the flag information may include a register identifier field whose value indicates the vector register to which that flag information relates. By allowing the register identifier field to be specified within the flag information, this increases flexibility, by allowing the flag setting circuitry to potentially consider vectors generated for storage in any of the vector registers of the vector register set.

Whilst in one embodiment the control storage may at any point in time only store flag information for one vector, in an alternative embodiment the control storage may have multiple entries to enable flag information for multiple vector registers to be maintained simultaneously. Whilst this increases the size requirements for the control storage, it improves flexibility by enabling more flag information to be maintained, hence potentially increasing the likelihood that improvements in memory access performance can be achieved when processing vector memory access operations.

In an alternative embodiment, rather than providing a separate control storage for the flag information, each vector register may include a control storage element to store the flag information for that vector register. This avoids the need to separately specify a register identifier for the flag information, and potentially allows flag information to be maintained for each of the vector registers in the vector register set at the same time. In such embodiments, each control storage element may store one or more valid flags, dependent on a determination as to the number of portions of the vector to be considered separately in relation to the contiguousness criteria. In addition, if required, each control storage element can capture the data value size information as discussed earlier.

In one embodiment, the flag setting circuitry is arranged to invalidate the flag information on occurrence of a specified event. The specified event can take a variety of forms, but in one embodiment is considered to occur when either an exception event occurs, or the processing circuitry performs an operation which writes to the vector register with which the flag information is associated.

By arranging for the flag information to be invalidated on the occurrence of such events, this means that the flag information does not have to be architecturally visible, and so does not need to be saved and restored around exceptions. It also means that the flags can share storage with other rarely used elements within the processor core, thus improving efficiency.

There are a variety of different events that could be arranged to trigger the flag setting circuitry to analyse a vector generated for storage in a vector register in order to determine whether flag information should be set for that vector. For example, in one embodiment, the data processing apparatus further comprises decoder circuitry to decode instructions in order to control the operations performed by the processing circuitry, the decoder circuitry being responsive to decoding a vector generating instruction of a type that is known will cause the processing circuitry to generate a vector comprising a plurality of elements whose values follow a regularly progressing sequence, to generate control signals to cause the flag setting circuitry to generate the flag information in association with the vector generated by the processing circuitry. Hence, for certain types of instructions where it is known that the resultant vector generated will have elements whose values follow a regularly progressing sequence, the flag setting circuitry can merely be triggered to generate the appropriate flag information, without the flag setting circuitry needing to perform any further analysis of the vector.

As another example, the processing circuitry may be arranged, responsive to a vector generating instruction identifying a scalar start value and wrapping control information, to generate a vector comprising a plurality of elements, the processing circuitry being arranged to generate the vector such that the first element in said plurality is dependent on the scalar start value, and the values of the plurality of elements follow a regularly progressing sequence that is constrained to wrap as required to ensure that each value is within bounds determined from the wrapping control information. When generating the vector the processing circuitry may be arranged to provide information to the flag setting circuitry to enable the flag setting circuitry to determine whether to generate the flag information.

Hence, when the processing circuitry is executing such a vector generating instruction, it will as part of the processing determine whether any wrapping is necessary, and hence can output information to the flag setting circuitry indicative of any such wrap locations, thus identifying which portions of the vector contain elements that follow the regularly progressing sequence. The flag setting circuitry can then use this information to determine whether to generate the flag information, and the form that flag information should take. Hence, if by way of example the flag information contains a single flag that is only set if all of the elements follow the regularly progressing sequence, then if a wrap point occurs when generating the vector, the flag information will not be set, whereas if a wrap point does not occur, the flag information will be set. In other embodiments, where multiple valid flags are provided, then the flag setting circuitry can determine whether each of those valid flags should be set, dependent on information about the presence of any wrap point, and where within the vector that wrap point occurs.

As another example of how the flag setting circuitry may be used, the flag setting circuitry itself may comprise comparison circuitry to analyse the elements of a vector generated for storage in a vector register in order to determine whether at least a subset of the elements in the vector have values that follow a regularly progressing sequence, and to generate the flag information in dependence on that analysis. The comparison circuitry of the flag setting circuitry can then be invoked at a point in time that is not on the critical timing path, and hence where the time taken to perform the necessary analysis will not impact performance within such a critical timing path. Such analysis may be performed prior to the generated vector being stored in the vector register, or alternatively could be performed after the vector has been stored in the vector register. For instance, the flag setting circuitry could use available processing time to speculatively analyse the contents of the vector registers and set flag information accordingly.

Particular embodiments will now be described with reference to the Figures.

FIG. 1 schematically illustrates an example of a data processing apparatus 2 supporting processing of vector instructions. It will be appreciated that this is a simplified diagram for ease of explanation, and in practice the apparatus may have many elements not shown in FIG. 1 for conciseness. The apparatus 2 comprises processing circuitry 4 for carrying out data processing in response to instructions decoded by an instruction decoder 6. Program instructions are fetched from a memory system 8 and decoded by the instruction decoder to generate control signals which control the processing circuitry 4 to process the instructions in the way defined by the architecture. For example, the decoder 6 may interpret the opcodes of the decoded instructions and any additional control fields of the instructions to generate control signals which cause the processing circuitry 4 to activate appropriate hardware units to perform operations such as arithmetic operations, load/store operations or logical operations. The apparatus has a set of scalar registers 10 and a set of vector registers 12. It may also have other registers (not shown) for storing control information used to configure the operation of the processing circuitry. In response to arithmetic or logical instructions, the processing circuitry typically reads source operands from the registers 10, 12 and writes results of the instructions back to the registers 10, 12. In response to load/store instructions, data values are transferred between the registers 10, 12 and the memory system 8 via a load/store unit 18 within the processing circuitry 4. The memory system 8 may include one or more levels of cache as well as main memory.

The set of scalar registers 10 comprises a number of scalar registers for storing scalar values which comprise a single data element. Some instructions supported by the instruction decoder 6 and processing circuitry 4 may be scalar instructions which process scalar operands read from the scalar registers 10 to generate a scalar result written back to a scalar register.

The set of vector registers 12 includes a number of vector registers, each arranged to store a vector value comprising multiple elements. In response to a vector instruction, the instruction decoder 6 may control the processing circuitry 4 to perform a number of lanes of vector processing on respective elements of a vector operand read from one of the vector registers 12, to generate either a scalar result to be written to a scalar register 10 or a further vector result to be written to a vector register 12. Some vector instructions may generate a vector result from one or more scalar operands, or may perform an additional scalar operation on a scalar operand in the scalar register file as well as lanes of vector processing on vector operands read from the vector register file 12. Hence, some instructions may be mixed scalar-vector instructions for which at least one of the one or more source registers and a destination register of the instruction is a vector register 12 and another of the one or more source registers and the destination register is a scalar register 10.

Vector instructions may also include vector load/store instructions which cause data values to be transferred between the vector registers 12 and locations in the memory system 8. The load/store instructions may include contiguous load/store instructions for which the locations in memory correspond to a contiguous range of addresses, or scatter/gather type vector load/store instructions which specify a number of discrete addresses and control the processing circuitry 4 to load data from each of those addresses into respective elements of a vector register or to store data from respective elements of a vector register to the discrete addresses.

The processing circuitry 4 may support processing of vectors with a range of different data element sizes. For example, a 128-bit vector register 12 could be partitioned into sixteen 8-bit data elements, eight 16-bit data elements, four 32-bit data elements or two 64-bit data elements. A control register may be used to specify the current data element size being used, or alternatively this may be a parameter of a given vector instruction to be executed.

The processing circuitry 4 may include a number of distinct hardware blocks for processing different classes of instructions. For example, load/store instructions which interact with the memory system 8 may be processed by a dedicated load/store unit 18, whilst arithmetic or logical instructions could be processed by an arithmetic logic unit (ALU). The ALU itself may be further partitioned into a multiply-accumulate unit (MAC) for performing operations involving multiplication, and a further unit for processing other kinds of ALU operations. A floating-point unit can also be provided for handling floating-point instructions. Pure scalar instructions which do not involve any vector processing could also be handled by a separate hardware block compared to vector instructions, or re-use the same hardware blocks.

As will be discussed in more detail with reference to the remaining figures, in accordance with one embodiment vector generating circuitry 16 is provided within the processing circuitry 4 that is arranged to perform operations required by a vector generating instruction that may be included within the sequence of instructions executed by the apparatus 2. The vector generating circuitry 16 could comprise a dedicated block within the processing circuitry 4, or may be incorporated within one of the other circuit blocks such as the ALU.

In accordance with some of the embodiments described herein, a new type of vector generating instruction may be defined that identifies a scalar start value and wrapping control information. When such an instruction is decoded by the instruction decoder 6, control signals are sent to the processing circuitry 4 to cause the vector generating circuitry 16 to generate a vector comprising a plurality of elements, with that generated vector then typically being stored within one of the vector registers 12. The vector generating circuitry 16 is arranged to generate the vector such that the first element in the vector is dependent on the scalar start value, and the values of the plurality of elements then follow a regularly progressing sequence that is constrained to wrap as required to ensure that each value is within bounds determined from the wrapping control information. The regularly progressing sequence can be a regularly increasing sequence or a regularly decreasing sequence, and in one embodiment different variants of the vector generating instruction are specified for both increasing and decreasing sequences.

Such a generated vector of elements can be useful in a variety of situations. However, one particular use case where such a vector is very useful is as an input operand for the earlier-mentioned vector gather/scatter load/store instructions. In particular, in one embodiment, the vector generated by the vector generating instruction can be used as a vector of offsets provided as an input operand for such a vector load/store instruction that causes gather/scatter operations to be performed. Such instructions typically also receive a scalar input specifying a base address, and the vector of offsets is then used to generate each of the addresses to be accessed in memory with reference to that base address. Whilst such vector load or store instructions can be used to access an arbitrary set of addresses within the memory, when using a vector of offsets generated by the above-mentioned vector generating instruction, this enables a sequence of addresses to be identified that reside within a circular buffer within memory. Hence, this mechanism provides a very efficient technique for employing circular addressing modes in memory, without needing to add additional circuitry into the memory access path, and hence avoiding the potential performance impact that such additional circuitry would introduce within that path. This provides significant benefits in vector processing systems, where the memory access path is often a critical timing path within the system.

As also shown in FIG. 1, beat control circuitry 20 can be provided if desired to control the operation of the instruction decoder 6 and the processing circuitry 4. In particular, in some embodiments the execution of the vector instruction may be divided into parts referred to as "beats", with each beat corresponding to processing of a portion of a vector of a predetermined size. As will be discussed in more detail later with reference to FIGS. 8 and 9, this can allow for overlapped execution of the vector instructions, thereby improving performance.

Figure 2:
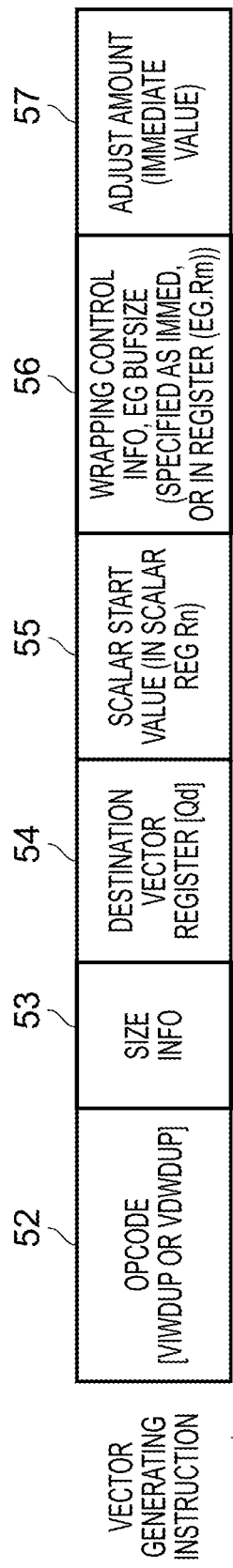
FIG. 2 schematically illustrates fields provided within a vector generating instruction in accordance with one embodiment.

FIG. 2 is a diagram schematically illustrating fields that may be provided within a vector generating instruction of the type discussed above. In particular, the instruction 50 may include a first field 52 specifying the opcode of the instruction. This can be used to identify that the instruction is the vector generating instruction, and can also be used to identify different variants of the instruction, such as incrementing or decrementing variants. In one particular embodiment, the incrementing variant of the vector generating instruction is referred to as a vector increment and wrap duplicate (VIWDUP) instruction, whilst the decrementing version is referred to as a vector decrement and wrap duplicate (VDWDUP) instruction. The "duplicate" reference is merely intended to identify that the value determined for each of the elements of the vector is derived from a scalar seed value, the actual value for each element being in this case an incremented or decremented version of the preceding element value, with the initial element value derived from the scalar seed value.

In one embodiment a size information field 53 is provided within the instruction to identify the size of the data values within a vector. In particular, where the processing circuitry allows data values of different sizes to be processed within a vector, then such a field can be used to identify the particular data value size to which the current instruction relates. In alternative embodiments, such size information may not be required, as the data value size may be predetermined.

The destination vector register field 54 identifies a vector register (for example referred to in FIG. 2 as the register Qd) into which the vector of elements generated by executing the instruction is to be written. The field 55 provides a scalar start value, which in one embodiment is identified with reference to one of the scalar registers (in the example of FIG. 2 this being referred to as the scalar register Rn).

A wrapping control information field 56 is also provided to identify wrapping information that is used to identify bounds, i.e. the points at which a regularly increasing sequence or a regularly decreasing sequence of values will need to wrap. In one particular embodiment, the wrapping control information is used to determine a first bound, and the second bound is predetermined. More particularly, in one embodiment the second bound is assumed to be a zero value. In such embodiments, the wrapping control information can for example provide size information, referred to herein as a buffer size or "BUFSIZE", and given that the second bound is predetermined, this enables the value of the first bound to be identified. The wrapping control information can be specified as an immediate value within the instruction, or could instead be identified with reference to a register, either one of the scalar registers 10 or one of the vector registers 12. In one embodiment, the wrapping control information is specified by a further scalar register, and in the example of FIG. 2 this is referred to as the scalar register Rm.

In one embodiment the data values subjected to vector processing may be of a predetermined size, but in alternative embodiments the data value size may be varied, such that when executing some instructions the data values are assumed to be of a first size, whilst when executing other instructions they are assumed to be of a different size. In embodiments that support different data value sizes, then the vector generating instruction 50 may include an adjust amount field 57 which can be specified in one embodiment as an immediate value, but which could alternatively be specified by the contents of a register. When the instruction is executed, the adjust amount will determine the amount by which each element is increased or decreased within the regularly progressing sequence. As mentioned earlier, in one embodiment the vector generated by the vector generating instruction will be used as a vector of address offsets for a subsequent vector load or store instruction, and hence the adjust amount can be set having regard to the size of the data values that will be accessed by that subsequent vector load or store instruction. For example, in one embodiment the adjust amount will be set to one if the data values that are subsequently to be accessed are byte size data values, will be set to two if the data values are 16-bits entities, and will be set to four if the data values are 32-bit entities.

Figure 3:
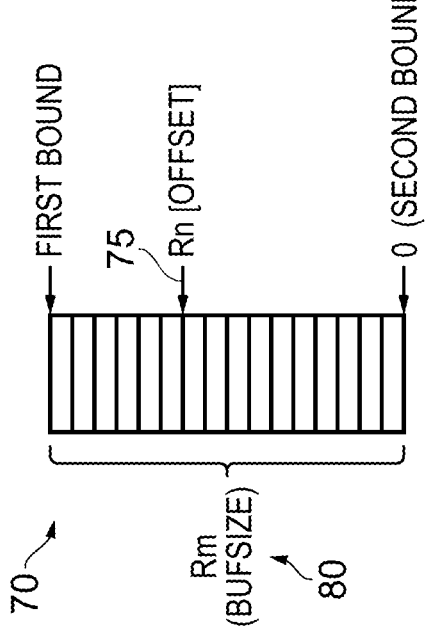
FIG. 3 schematically illustrates vectors of elements that can be generated for particular examples of the vector generating instruction in accordance with one embodiment.

The manner in which the vector of elements is generated when executing the vector generating instruction is illustrated in more detail with reference to the particular example of FIG. 3. In this example, it is assumed that the vector generating instruction is the VIWDUP instruction, i.e. the incrementing variant. As shown in FIG. 3, a logical buffer 70 is identified having a second bound which is assumed to have a zero value, and a first bound that is identified with reference to the buffer size 80. The scalar start value 75 identifies a particular point within that logical buffer that is used as a starting value. In the example illustrated in FIG. 3, the buffer size is assumed to be 16, i.e. 16 bytes, and it is assumed that the vector length is 128 bits. The buffer size has been chosen to be relatively small purely for illustration, since this helps to illustrate the wrapping behaviour of the operation for each of the three examples shown in FIG. 3. In practice, the buffer size may be significantly larger, so that occurrences of wrapping taking place when generating any particular instance of the vector will be reduced.

As illustrated in example one, it is assumed that the adjust amount is set to one, i.e. indicating that the associated data value size is 8 bits, and the scalar start value is set to nine, this resulting in the generation of the vector shown in example one containing sixteen entries, one for each of the 8-bit sized data values. As can be seen, the elements within the vector follow a regularly increasing sequence, but wrap at the point where the value would have been incremented to the first bound value, at that point the sequence returning to zero and then increasing thereafter.

Example two shows a situation where the adjust amount is set to two, i.e. identifying that the associated data values are 16 bits in size. It is assumed in this instance that the scalar start value is ten, and this results in the generation of the vector shown in FIG. 3 having eight elements, one for each of the 16-bit sized data values within a 128-bit vector. Again, the wrap point is seen to occur where the value would have been incremented to the first bound value, but instead is then wrapped back to a logic zero value.

Example three shows an example where the adjust amount is set to four, indicating that the data value size is 32 bits. In this example, the initial scalar start value is eight, and this results in the generation of the vector of elements shown in FIG. 3, where there are four elements within the vector, one for each of the 32-bit data values within a 128-bit vector. Again, it can be seen that a wrapping occurs at the appropriate point.

The use of a specific instruction to generate vectors of this type provides a great deal of flexibility with regard to the specification of circular buffers in memory. In principle, such circular buffers can be of any size, and at any location within the memory, and indeed if desired multiple buffers can be defined that overlap within the memory address space.

In one embodiment, a number of constraints can be placed on the specification of the buffer size and the scalar start value, in order to simplify the circuitry required to implement the vector generating operation. For example, in one embodiment the buffer size may be constrained to be a multiple of the adjust amount. In addition, if desired, the scalar start value can be constrained to be a multiple of the adjust amount. These two constraints can be seen to be in place for the three examples illustrated in FIG. 3. By using such constraints, the circuitry required to detect the wrap points can be implemented in at least some embodiments using equality checking circuitry rather than circuitry that needs to detect greater than or less than conditions.

The functionality implemented when executing either the VIWDUP or the VDWDUP instructions can be illustrated as follows:

```
VIWDUP.<size> Qd, Rn, Rm, #imm          with imm restricted to
                                              {1,2,4,8}
offset   = Rn;              // Rn specifies current offset
bufsize = Rm;               // Rm specifies size of buffer in bytes
for e = 0 ... N
   Qd[e] = offset;
   offset = offset + imm;
   if offset == bufsize     → offset = 0;
Rn = offset;
VDWDUP.<size> Qd, Rn, Rm, #imm          with imm restricted to
                                              {1,2,4,8}
offset   = Rn;              // Rn specifies current offset
bufsize = Rm;               // Rm specifies size of buffer in bytes
for e = 0 ... N
   Qd[e] = offset;
   if  offset == 0   → offset = bufsize − imm;
   else              → offset = offset − imm;
Rn = offset;
```

The above functionality is discussed in more detail with reference to the flow diagram of FIG. 4. At step 100, a vector generating instruction with wrap function is executed, whereafter at step 105 the scalar register Rn is read to obtain the initial offset, i.e. the scalar start value. In addition, at step 110, the scalar register Rm is read to obtain the buffer size information. Thereafter, at step 115, a variable "e" is set equal to zero, and then at step 120 the e-th element within the result vector register is set equal to the current offset value. The subsequent steps performed are then dependent on whether the vector generating instruction executed is the incrementing version or the decrementing version.

If it is determined at step 125 that it is the incrementing version, then at step 130 the offset is incremented by the immediate value, i.e. the adjust amount, whereafter at step 135 it is determined whether the offset is now equal to the buffer size. If it is, then the offset is reset to zero at step 140 prior to proceeding to step 145, whereas if it is not the process proceeds directly to step 145. At step 145, it is determined whether the value of e has reached a maximum value, this being dependent on the number of data values within the vector of a predetermined length (as determined from the data value size). If e is not yet at the maximum value, then e is incremented at step 150, prior to the process returning to step 120.

If at step 125 it is determined that the instruction being executed is the decrementing version, then at step 155 it is determined whether the offset currently equals zero. If it does, then the offset is adjusted at step 160 to a value equal to subtracting the immediate value from the buffer size. However, if it is not determined to be equal to zero at step 155, then the offset is decremented by the immediate value at step 165. Following steps 160 or 165, the process then proceeds to step 145.

Once it is determined at step 145 that e has reached its maximum value, then all of the elements of the vector will have been generated, and accordingly the result vector Qd will contain the desired plurality of elements. The process then proceeds to step 170 where, in one embodiment, the offset value within the register Rn is updated. Step 170 is optional, but can be useful if the vector generating instruction is to be executed iteratively, for example within the body of a loop, as on the next iteration the register Rn will then already contain the appropriate start value for that next iteration.

Figure 4:
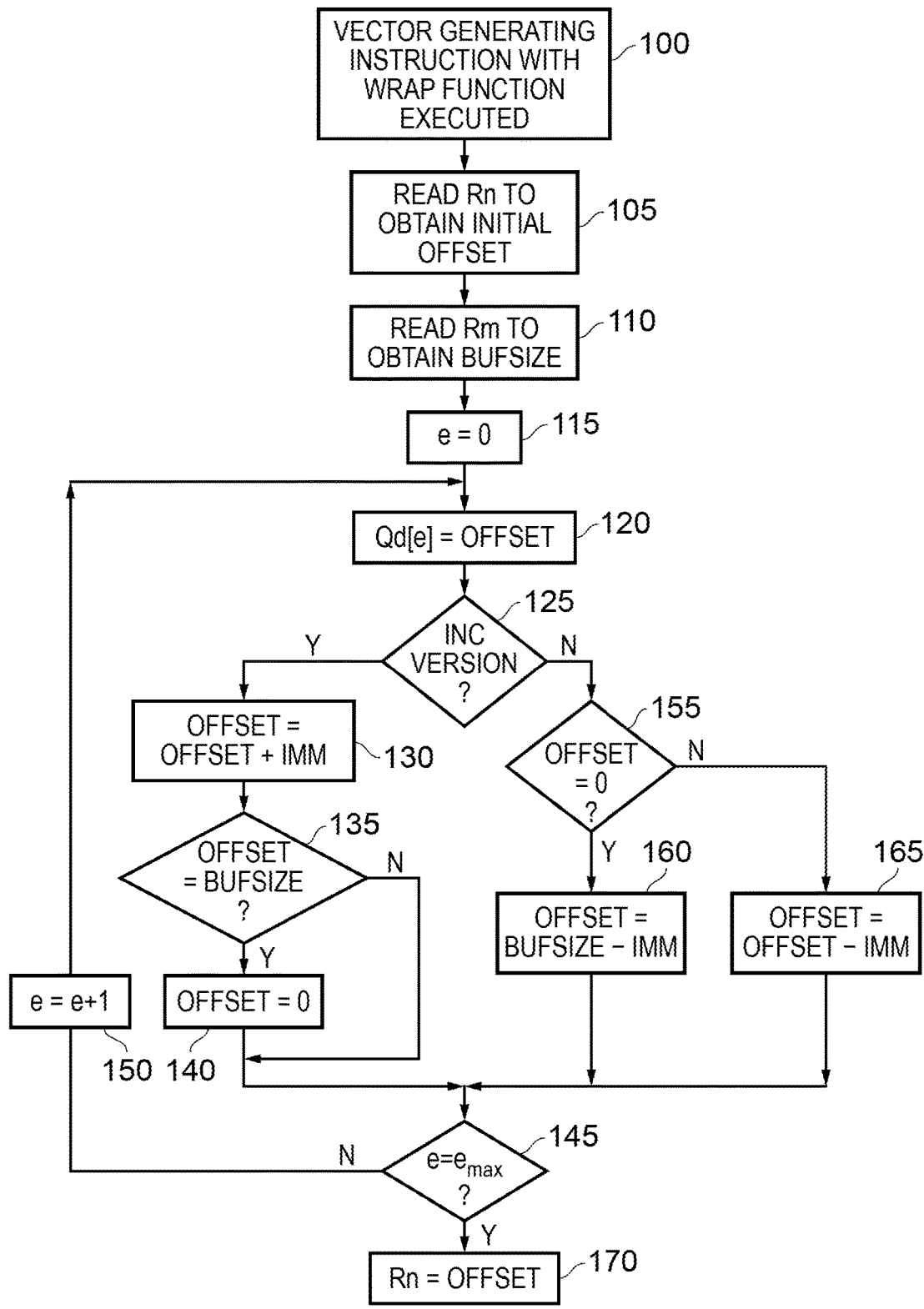
FIG. 4 is a flow diagram illustrating the processing performed when executing a vector generating instruction in accordance with one embodiment.

As an alternative to the approach shown in FIG. 4, in some embodiments the scalar register Rn may be updated during each iteration. Hence, in this embodiment, box 170 can be considered to reside within the "no" path from step 145. Following a final iteration where it is determined that e is equal to its maximum value, the process will then follow the "yes" path, and will again update the contents of the register Rn as per the procedure shown in FIG. 4.

Whilst in one embodiment the source register Rm specifies the buffer size, in an alternative embodiment it could directly specify the wrapping point value, by providing a value equal to subtraction of the immediate value from the size of the buffer. In such an arrangement, the earlier-described functionality for the VIWDUP instruction becomes the following:

```
VIWDUP.<size> Qd, Rn, Rm, #imm      with imm restricted to {1,2,4,8}
offset = Rn;                        // Rn specifies current offset
wrap   = Rm;                        // Rm specifies size of buffer in bytes – imm
for e = 0 ... N
    Qd[e] = offset;
    if offset == wrap →offset = 0;
    else offset = offset + imm;
Rn = offset;
```

This approach can potentially reduce the hardware requirements, and would enable the determination as to whether to wrap to be performed in parallel with the incrementing of the offset.

The corresponding functionality for the VDWDUP instruction is as follows:

```
VDWDUP.<size> Qd, Rn, Rm, #imm      with imm restricted to {1,2,4,8}
offset = Rn;                        // Rn specifies current offset
wrap   = Rm;                        // Rm specifies size of buffer in bytes – imm
for e = 0 ... N
    Qd[e] = offset;
    if    offset == 0         → offset = wrap;
    else                      → offset = offset – imm;
Rn = offset;
```

Figure 5:
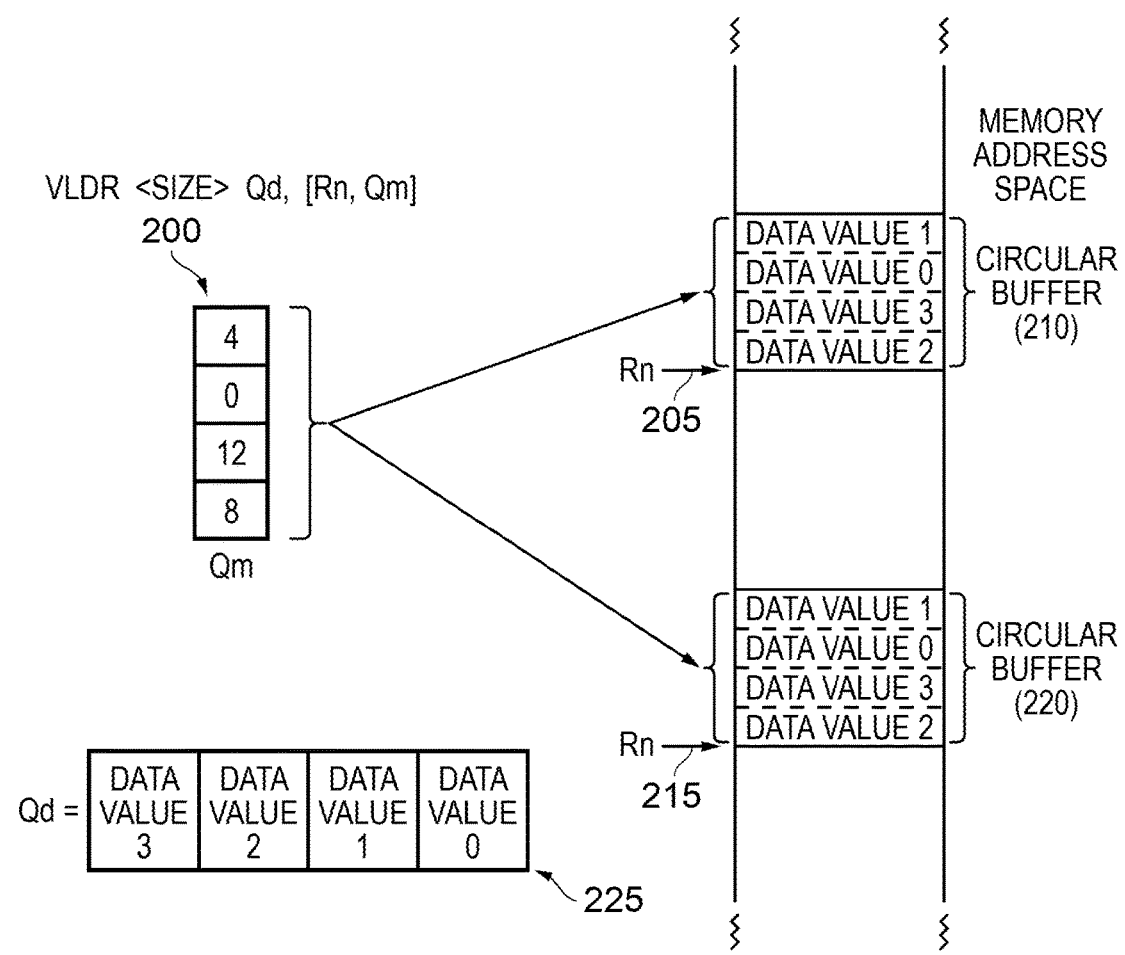
FIG. 5 schematically illustrates how a vector generated by the vector generating instruction may be used as an input to a vector access instruction to identify circular buffers within the memory address space in accordance with one embodiment.

FIG. 5 illustrates how a vector of elements generated in the above described manner can then be used as an input operand for a vector memory access instruction. In particular, in the example of FIG. 5 it is assumed that the vector memory access instruction is a vector load instruction that is arranged to perform a gather of data values from locations in memory specified by a vector of address offsets Qm. The resultant data values are then stored as a elements within the result vector Qd. A scalar register Rn contains a base address in memory, which is combined with the vector of offsets to identify the individual addresses to be accessed. As with the vector generating instruction, the vector access instruction can include a size field to identify the size of the data values being processed.

Whilst such a vector load instruction can be used to gather data values from arbitrary addresses in memory, when the vector source register Qm is set to be the vector generated by execution of the VIWDUP or VDWDUP instruction, then it will be understood that the addresses accessed actually correspond to a circular buffer within memory. Hence, if we consider for example a situation where the vector of elements generated by an earlier VIWDUP instruction is as shown by the element 200 in FIG. 5, i.e. the same as the result in example three of FIG. 3 discussed earlier, where the vector is 128 bits in length, and the data values are 32-bit data values, then as shown in FIG. 5 a circular buffer will be accessed within the memory address space, with the start location of that circular buffer being dependent on the scalar value provided within the register Rn. Hence, if that scalar value has a first value 205, the circular buffer takes the form shown by the element 210, whereas if in another example the scalar value has the value 215, then the circular buffer is shown by the element 220. Hence, this approach provides a great deal of flexibility as to where the circular buffer is defined within the memory address space. When using the vector of offsets 200, then the data is retrieved from the relevant circular buffer and stored within the result vector register Qd to take the form 225 shown in FIG. 5.

Whilst as discussed earlier with reference to FIG. 4 the functionality performed when executing either the VIWDUP or VDWDUP instructions can be implemented as an iterative sequence, where one element of the vector is generated in each iteration, in some embodiments the vector generating circuitry can be arranged so as to enable multiple of the elements to be generated in parallel.

Figure 6:
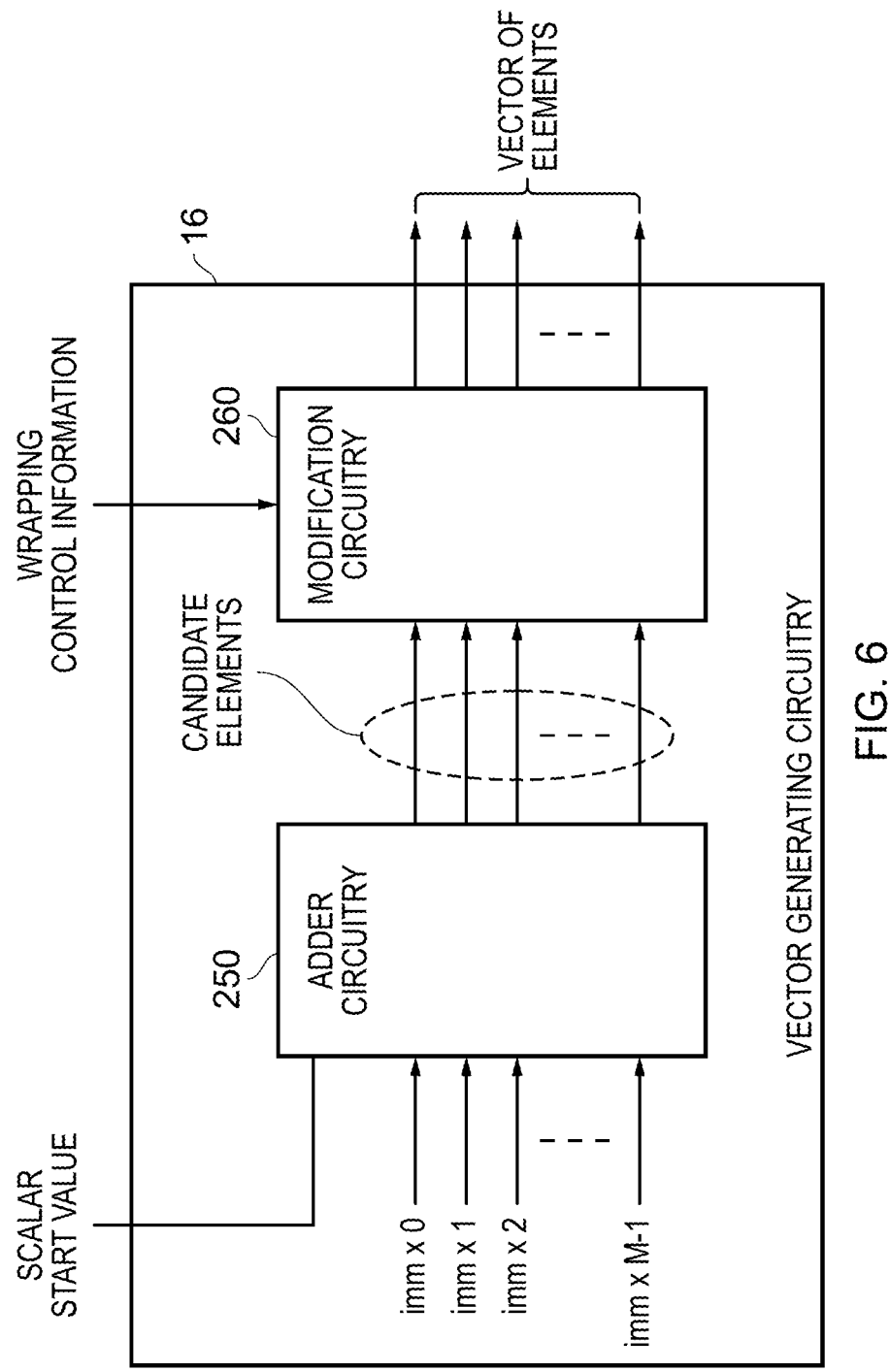
FIG. 6 is a block diagram illustrating in more detail the arrangement of the vector generating circuitry of FIG. 1 in accordance with one embodiment.

FIG. 6 is a block diagram illustrating one such arrangement of vector generating circuitry. In this example, adder circuitry 250 is provided which may in one embodiment contain a plurality of separate adder blocks, each adder block being arranged to generate a candidate element for the output vector. Modification circuitry 260 is then provided having a separate modification block corresponding to each of the adder blocks, each modification block selectively modifying the candidate element output by the corresponding adder block in dependence on whether a wrap condition is detected for that candidate element's value. The adder circuitry receives the scalar start value 250, and various multiples of the immediate value. The modification circuitry 260 receives the wrapping control information.

In one embodiment, both the adder circuitry 250 and the associated modification circuitry 260 may contain sufficient blocks to enable values for all of the elements of the vector to be computed in parallel. Alternatively, for at least some data value sizes it may be that the adder circuitry and modification circuitry do not have sufficient blocks to compute the values of all of the elements in parallel, but that values for all of the elements can be computed as a result of two or more passes through the adder circuitry and modification circuitry.

In the example shown in FIG. 6, it is assumed that the vector has M elements, and the adder circuitry 250 and modification circuitry 250 can generate all of the elements of the vector in parallel.

Figure 7A:
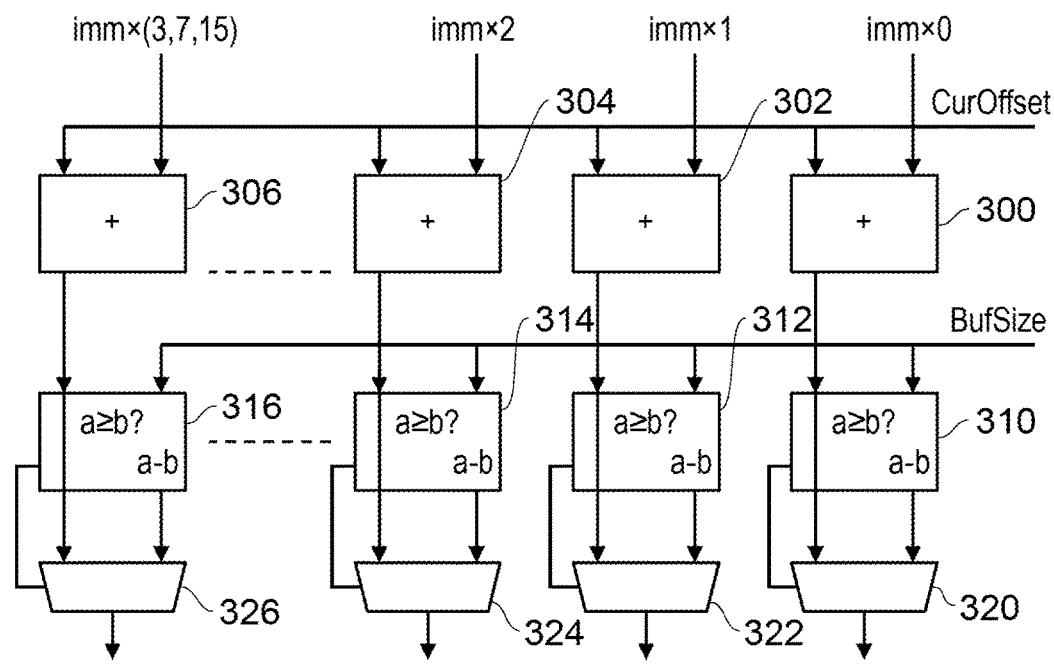
FIGS. 7A to 7C schematically illustrate the arrangement of the adder circuitry and modification circuitry of FIG. 6 in accordance with three example embodiments.

FIG. 7A illustrates one example form of the vector generating circuitry 16 of FIG. 6 used when processing a VIWDUP instruction, i.e. the incrementing version of the instruction. The adder circuitry in this instance comprises a sequence of adder blocks 300, 302, 304, 306, each of which is provided with an associated multiple of the immediate value, and the current offset, i.e. the scalar start value. It will be appreciated that the number of adder blocks required (assuming all of the elements of the vector are to be generated in a parallel) is dependent on the data value size. For the three examples discussed earlier with reference to FIG. 3, it will be seen that the vector to be generated will either have four elements, eight elements or sixteen elements, depending on the data value size (and assuming a vector length of 128 bits), and hence the final adder 306 in the sequence will either receive a second input corresponding to three times the immediate value, seven times the immediate value or fifteen times the immediate value.

In one embodiment, a single vector generating circuit can be provided having sixteen adder blocks and 16 modification blocks, and in instances where not all of the blocks are required, certain of the blocks can be turned off. Hence, only a quarter of the blocks will need to be activated when generating a vector having four elements, half of the blocks will need to be activated when generating a vector having eight elements, and all of the blocks will be activated when generating a vector having sixteen elements.

Each of the adder blocks 300 then adds the specified multiple of the immediate value to the current offset in order to generate a candidate element that is forwarded as one input to an associated comparison block 310, 312, 314, 316 within the modification circuitry 260. The other input to each comparison block is the buffer size value in this example embodiment. Each comparison block then determines whether the output from the associated adder block is greater than or equal to the buffer size. In addition, it computes a value (denoted as "a-b" in FIG. 7A) equivalent to subtracting the buffer size from the input received from the associated adder block. Each multiplexer circuit 320, 322, 324, 326 then receives the output from the associated adder block and the "a-b" output from the associated modification block, and is controlled in dependence on the output of the comparison performed by the comparison block. Hence, if it is determined that the output of the adder is not greater than or equal to the buffer size, then the output from the adder is output from the associated multiplexer, whereas if it is determined that the output from the adder is greater than or equal to the buffer size, then the output from the modification block is output from the multiplexer, i.e. an output corresponding to subtraction of the buffer size from the value output by the associated adder block.

Figure 7B:
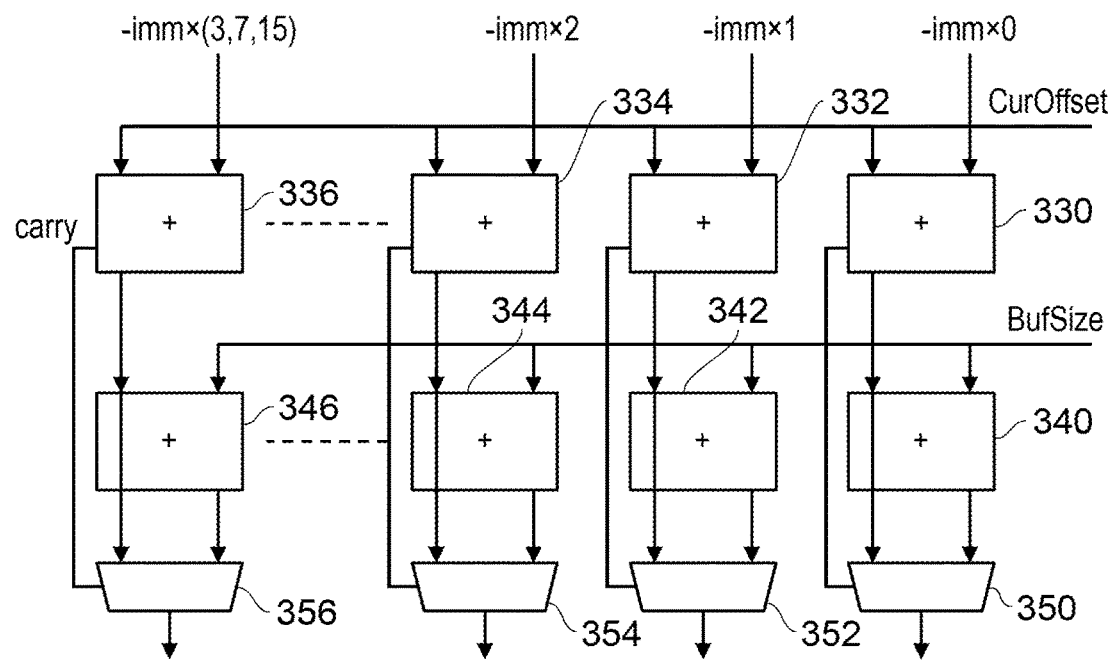

An example of circuitry that can be used to perform the operations required by the VDWDUP instruction in one embodiment is shown in FIG. 7B. Again, a series of adder blocks 330, 332, 334, 336 are provided, and again these receive as one input the current offset, and as the other input a multiple of the immediate value. However, in this example the multiple received is a negative multiple of the immediate value, causing the adders to perform a subtraction of that multiple of the immediate value from the current offset value. The output from the adder block is forwarded on to the modification circuitry, and in addition a carry out signal is also propagated on to the modification circuitry. In this example, the modification circuitry does not need to include comparison blocks, but instead can include further adder blocks 340, 342, 344, 346 which receive as one input the output from the associated adder blocks 330, 332, 334, 336 and receive as a second input the buffer size information. Each of the further adder blocks then adds the buffer size value to the output from the adder block and provides that value as a second input to the associated multiplexers 350, 352, 354, 356, the first input of each multiplexer being the output from the adder blocks 330, 332, 334, 336 of the adder circuitry 250. If the output from any of the adder blocks 330, 332, 334, 336 is a negative value, then the carry bit will indicate this, and this can be used to control the multiplexer accordingly, such that if the carry bit indicates a negative value, the multiplexer selects the output from the associated modification circuit block 340, 342, 344, 346 instead of the original output from the adder block 330, 332, 334, 336.

Figure 7C:
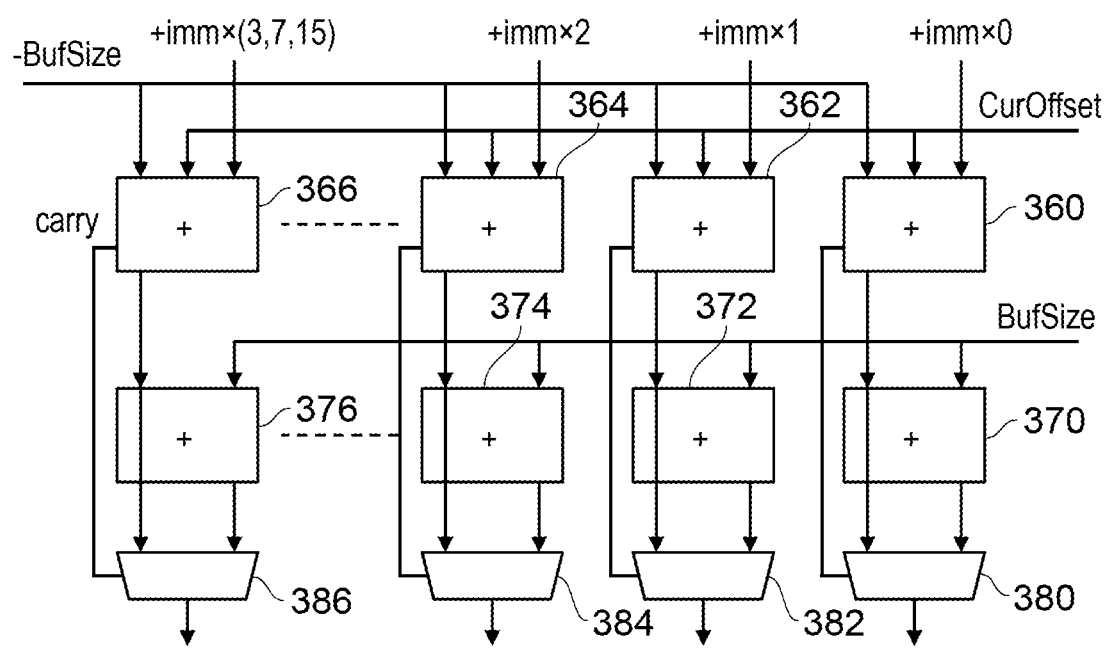

As can be seen from the above comparison of FIGS. 7A and 7B, the circuitry used when implementing the VDWDUP instruction can be significantly simplified, by use of the carry signal from the adder, thus avoiding the need for comparison circuitry. FIG. 7C illustrates an alternative arrangement of circuitry that can be used when implementing the VIWDUP instruction, which also enables the carry signal to be used to avoid comparison circuits. As shown in FIG. 7C, each of the adder blocks 360, 362, 364, 366 receives the current offset and the multiples of the immediate values as per the example circuitry of FIG. 7A, but in addition receives a third input of "−BufSize". As a result, this effectively causes the adders to subtract the buffer size from the current offset at the start, and as a result it is possible that some of the outputs from the adder will be negative, which will be indicated via the carry bit signal. The components 370, 372, 374, 376 correspond to the components 340, 342, 344, 346 of FIG. 7B. For any outputs that are negative, the associated multiplexers 380, 382, 384, 386 will select the adjusted output from the components 370, 372, 374, 376 in place of the original output from the adder blocks 360, 362, 364, 366.

Hence, when adopting the circuitry of FIG. 7C, execution of the VIWDUP instruction can be very efficiently performed in order to generate the elements of the vector in parallel, and without the requirement for comparison circuits. Adding three numbers instead of two is easily accommodated within the adders 360, 362, 364, 366 by using a row of full adders to "reduce" the three inputs to two addends to input to the carry-propagate adder.

Furthermore, it should be noted that the same circuitry can be used to perform the VDWDUP operation, merely be setting the "−BufSize" input to zero, and arranging for the multiples of the immediate to be subtracted instead of being added.

Figure 8:
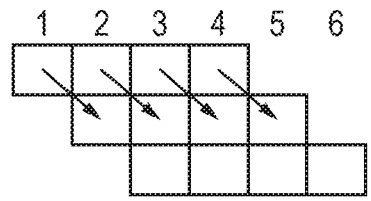
FIG. 8 shows an example of overlapped execution of vector instructions.

In some applications such as digital signal processing (DSP), there may be a roughly equal number of ALU and load/store instructions and therefore some large blocks such as the MACs can be left idle for a significant amount of the time. This inefficiency can be exacerbated on vector architectures as the execution resources are scaled with the number of vector lanes to gain higher performance. On smaller processors (e.g. single issue, in-order cores) the area overhead of a fully scaled out vector pipeline can be prohibitive. One approach to minimise the area impact whilst making better usage of the available execution resource is to overlap the execution of instructions, as shown in FIG. 8. In this example, three vector instructions include a load instruction VLDR, a multiply instruction VMUL and a shift instruction VSHR, and all these instructions can be executing at the same time, even though there are data dependencies between them. This is because element 1 of the VMUL is only dependent on element 1 of Q1, and not the whole of the Q1 register, so execution of the VMUL can start before execution of the VLDR has finished. By allowing the instructions to overlap, expensive blocks like multipliers can be kept active more of the time.

Hence, it can be desirable to enable micro-architectural implementations to overlap execution of vector instructions. However, if the architecture assumes that there is a fixed amount of instruction overlap, then while this may provide high efficiency if the micro-architectural implementation actually matches the amount of instruction overlap assumed by architecture, it can cause problems if scaled to different micro-architectures which use a different overlap or do not overlap at all.

Figure 9:
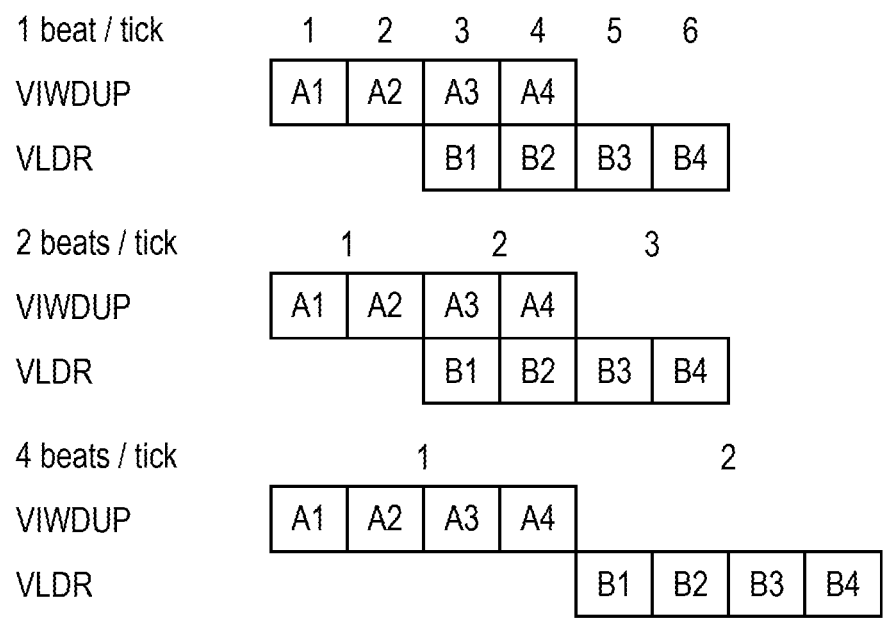
FIG. 9 shows three examples of scaling the amount of overlap between successive vector instructions between different processor implementations or at run time between different instances of execution of the instruction.

Instead, an architecture may support a range of different overlaps as shown in examples of FIG. 9. The execution of a vector instruction is divided into parts referred to as "beats", with each beat corresponding to processing of a portion of a vector of a predetermined size. A beat is an atomic part of a vector instruction that is either executed fully or not executed at all, and cannot be partially executed. The size of the portion of a vector processed in one beat is defined by the architecture and can be an arbitrary fraction of the vector. In the examples of FIG. 9 a beat is defined as the processing corresponding to one quarter of the vector width, so that there are four beats per vector instruction. Clearly, this is just one example and other architectures may use different numbers of beats, e.g. two or eight. The portion of the vector corresponding to one beat can be the same size, larger or smaller than the element size of the vector being processed. Hence, even if the element size varies from implementation to implementation or at run time between different instructions, a beat is a certain fixed width of the vector processing. If the portion of the vector being processed in one beat includes multiple elements, carry signals can be disabled at the boundary between respective elements to ensure that each element is processed independently. If the portion of the vector processed in one beat corresponds to only part of an element and the hardware is insufficient to calculate several beats in parallel, a carry output generated during one beat of processing may be input as a carry input to a following beat of processing so that the results of the two beats together form an element.

As shown in FIG. 9 different micro-architecture implementations of the processing circuit 4 may execute different numbers of beats in one "tick" of the abstract architectural clock. Here, a "tick" corresponds to a unit of architectural state advancement (e.g. on a simple architecture each tick may correspond to an instance of updating all the architectural state associated with executing an instruction, including updating the program counter to point to the next instruction). It will be appreciated by one skilled in the art that known micro-architecture techniques such as pipelining may mean that a single tick may require multiple clock cycles to perform at the hardware level, and indeed that a single clock cycle at the hardware level may process multiple parts of multiple instructions. However such micro-architecture techniques are not visible to the software as a tick is atomic at the architecture level. For conciseness such micro-architecture are ignored during further description of this disclosure.

As shown in the lower example of FIG. 9, some implementations may schedule all four beats of a vector instruction in the same tick, by providing sufficient hardware resources for processing all the beats in parallel within one tick. This may be suitable for higher performance implementations. In this case, there is no need for any overlap between instructions at the architectural level since an entire instruction can be completed in one tick.

On the other hand, a more area efficient implementation may provide narrower processing units which can only process two beats per tick, and as shown in the middle example of FIG. 9, instruction execution can be overlapped with the first and second beats of a second vector instruction carried out in parallel with the third or fourth beats of a first instruction, where those instructions are executed on different execution units within the processing circuitry (e.g. in FIG. 9 the first instruction is a vector increment and wrap instruction executed within a unit providing the vector generating circuitry and the second instruction is a load instruction executed using a load/store unit).

A yet more energy/area-efficient implementation may provide hardware units which are narrower and can only process a single beat at a time, and in this case one beat may be processed per tick, with the instruction execution overlapped and staggered for example by two beats as shown in the top example of FIG. 9.

It will be appreciated that the overlaps shown in FIG. 9 are just some examples, and other implementations are also possible. For example, some implementations of the processing circuitry 4 may support dual issue of multiple instructions in parallel in the same tick, so that there is a greater throughput of instructions. In this case, two or more vector instructions starting together in one cycle may have some beats overlapped with two or more vector instructions starting in the next cycle.

As well as varying the amount of overlap from implementation to implementation to scale to different performance points, the amount of overlap between vector instructions can also change at run time between different instances of execution of vector instructions within a program. Hence, the processing circuitry 4 and instruction decoder 6 may reference beat control circuitry 20 as shown in FIG. 1 used to control the timing at which a given instruction is executed relative to the previous instruction. This gives the micro-architecture the freedom to select not to overlap instructions in certain corner cases that are more difficult to implement, or dependent on resources available to the instruction. For example, if there are back to back instructions of a given type (e.g. multiply accumulate) which require the same resources and all the available MAC or ALU resources are already being used by another instruction, then there may not be enough free resources to start executing the next instruction and so rather than overlapping, the issuing of the second instruction can wait until the first has completed.

Accordingly, from the above description of FIG. 9, it can be seen that there is a great deal of flexibility as to how the vector generating instruction and associated memory access instruction are executed, but they can be closely coupled so as to cause the vector memory access instruction to consume the vector generated by the vector generating instruction relatively quickly. This can be useful, as the number of vector registers is typically a scarce resource, and accordingly by not requiring the vector generated by the vector generating instruction to be retained within the vector registers for a prolonged period, this can free up the vector register resources. The form of the vector generating instruction itself also assists in achieving this benefit, as no vector operand is required as a source operand to the vector generating instruction, and instead the vector generating instruction takes its inputs from either immediate values or scalar registers.

Figure 10:
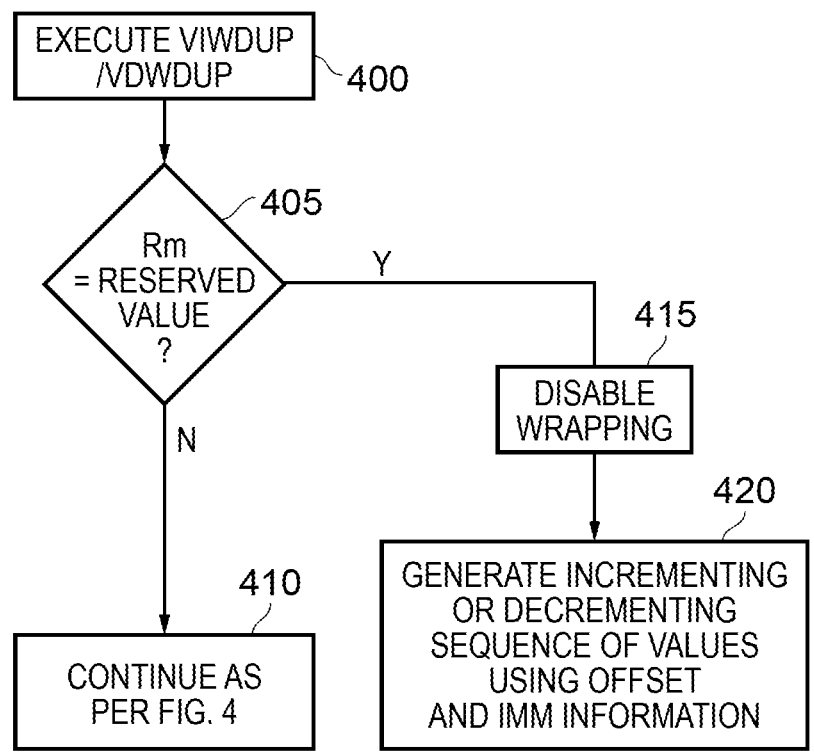
FIG. 10 is a flow diagram schematically illustrating how the wrapping functionality of the vector generating instruction may be selectively disabled in accordance with one embodiment.

In some embodiments, it is possible for the wrapping functionality provided by the vector generating instruction to selectively be disabled, and this is illustrated by way of example with reference to the flow diagram of FIG. 10. In particular, at step 400 the vector generating instruction is executed, and at step 405 it is determined whether the scalar register Rm (i.e. the register specifying the wrapping control information) is set to a reserved value. For instance, it could be that one or more of the scalar registers are not valid scalar registers to specify for such wrapping control information, and accordingly by setting the register Rm to one of those registers, this identifies that the wrapping functionality is to be disabled. In one particular example this may be achieved by specifying the program counter register as the register Rm. If the register Rm does not specify a reserved value, then as indicated by step 410 the process continues as usual, for example implementing the earlier-described process of FIG. 4. However, if the register Rm is a reserved value, then wrapping is disabled at step 415, and the vector generating circuitry at step 420 generates an incrementing or decrementing sequence of values using the offset and the immediate (i.e. adjust amount) values, but without any wrapping constraint. This can provide additional flexibility in the use of the VIWDUP and VDWDUP instructions (which in the wrapping disabled variant may be referred to as VIDUP and VDDUP instructions).

Further performance and efficiency benefits can be realised by constraining the specification of the scalar registers Rm and Rn. In particular, if one scalar register is constrained to be within a first group of scalar registers that is not overlapping with a group of scalar registers from which the other scalar register is chosen, then it may be possible to access the contents of both registers at the same time using the read access circuitry of the scalar register file 10, either with fewer read ports than would be required if the registers were not constrained in such a way, or with the register file split into two independent banks. This is illustrated schematically in FIG. 11, where the two groups are even and odd registers. Hence, all of the even registers R0 455, R2 465, etc. are within one group, and all of the odd registers R1 460, R3 470, etc. are within a further group. If the scalar start value is constrained to be specified by a register within one of the those groups, whilst the wrapping control information is specified by a register within the other group, then as shown by the read access circuitry 450 in FIG. 11, it is possible using the outputs from the multiplexers 475 and 480 to access both the contents of an odd register and an even register via a single read port. This is achieved by tapping off those values before they are input to the final multiplexer 485, the final multiplexer 485 still allowing a single register output to be read if desired.

Figure 11:
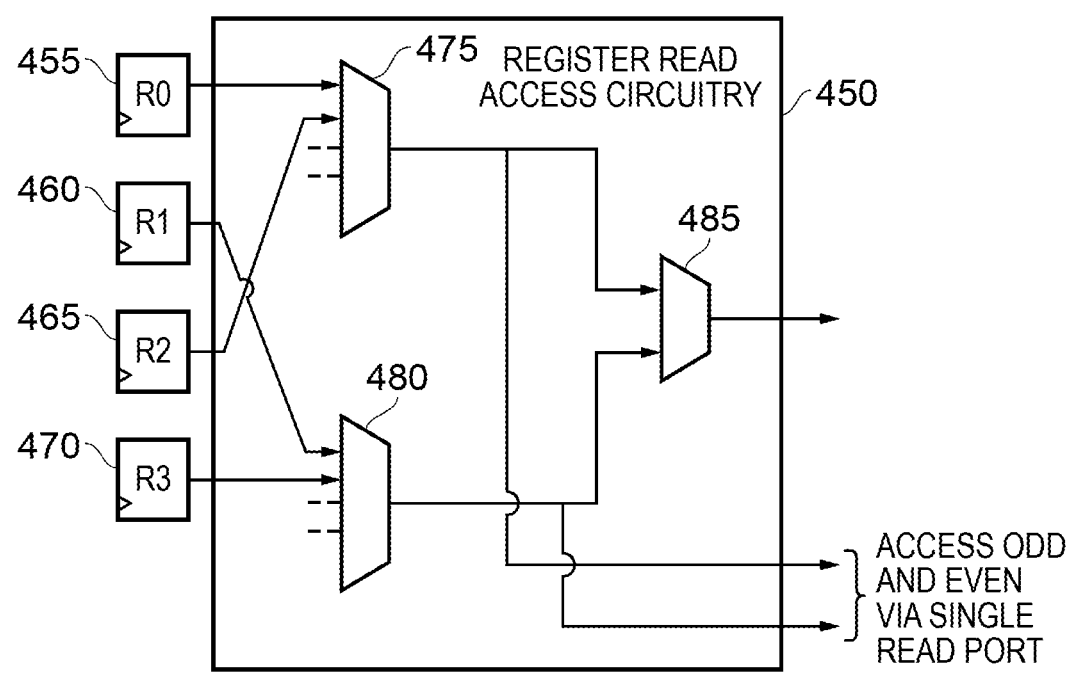
FIG. 11 schematically illustrates an arrangement of read access circuitry that may be used in association with a set of scalar registers in accordance with one embodiment.

Whilst in FIG. 11 the example is illustrated with regard to groups of even registers and groups of odd registers, more generally the same benefit can be achieved by constraining the register specifying the offset and the register specifying the buffer size to be from non-overlapping portions of the scalar register set.

The following is an example sequence of code illustrating how the proposed instructions discussed above could be used to efficiently allow the use of a circular memory:

| | |
|---|---|
| MOV | r8, #0 |
| MOV | r9, #0 |
| MOV | r10, #0 |
| WLSTP.32 | lr, %[loops], loop1End |
| loop1Start: | |
| VLDRW.32 | q0, [%[srcCoeff]], 0x10 |
| VIWDUP.32 | q7, r10, %[circ_buff_size], 0x4 |
| VLDRW.32 | q1, [%[srcSamplesCircular], q7] |
| VMLALZA.S32 | r9, r8, q0, q1 |
| LE | lr, loop1Start |
| loop1End: | |

The first three move instructions are used to initialise the contents of the scalar registers r8, r9 and r10 to logic zero values, and then the WLSTP instruction sets up a loop, storing the number of loops into the link register. The VLDRW instruction then performs a contiguous load of data from an address specified in a scalar register (indicated as "srcCoeff") and stores the resultant data values in the vector register q0, the instruction then also incrementing the address in the scalar register. The VIWDUP instruction then operates as discussed earlier to generate a vector of offsets stored within the vector register q7. Since the data value size is 32 bits, the immediate value is four. The subsequent VLDRW instruction then uses the contents of the vector register q7, and a base address specified in a source register (referred to as "srcSamplesCircular") to access in memory data values that are then stored within the vector register q1. A vector multiply accumulate operation is then performed, where each element in q0 is multiplied with the corresponding element in q1 and then accumulated within a scalar value held within the registers r8 and r9. This process continues through multiple iterations of the loop until the required number of loops has been performed.

As discussed earlier, one type of vector memory access operation that can be performed accesses a plurality of data values in memory at addresses determined from an address vector operand comprising a plurality of address elements. Whilst the address vector operand may directly specify the individual addresses to be accessed, often the address vector operand specifies a vector of offsets, which are combined with a base address in order to identify the addresses to be accessed. Such operations allow data to be accessed in arbitrary memory locations, and are often referred to as gather operations when loading data from addresses in memory into the individual elements of a vector, or scatter operations when storing the individual elements from a vector to the identified address locations.

Due to the fact that the addresses involved in such scatter or gather operations can be arbitrary, the processing of such operations typically requires the various access requests to be serialised, such that a series of independent load or store operations are performed. In the cases where the accesses are indeed arbitrary, this is reasonable and necessary. However, it has been realised that there are an increasing number of cases where such scatter or gather type memory access operations are used, but where at least some of the addresses to be accessed are in fact consecutive, and accordingly multiple of the data values could be accessed via a single access to contiguous addresses in the memory. One particular example of this is when using the earlier-described vector increment and wrap or vector decrement and wrap instructions to generate the vector of offsets that are then used when performing a gather or scatter operation, since the addresses will be consecutive other than where a wrap point is reached.

However, in vector processing systems the access path to memory is often a critical timing path, and accordingly it is typically not practical to provide circuitry within the memory access path to analyse the addresses at the time the vector memory access operation is to be processed.

Figure 12:
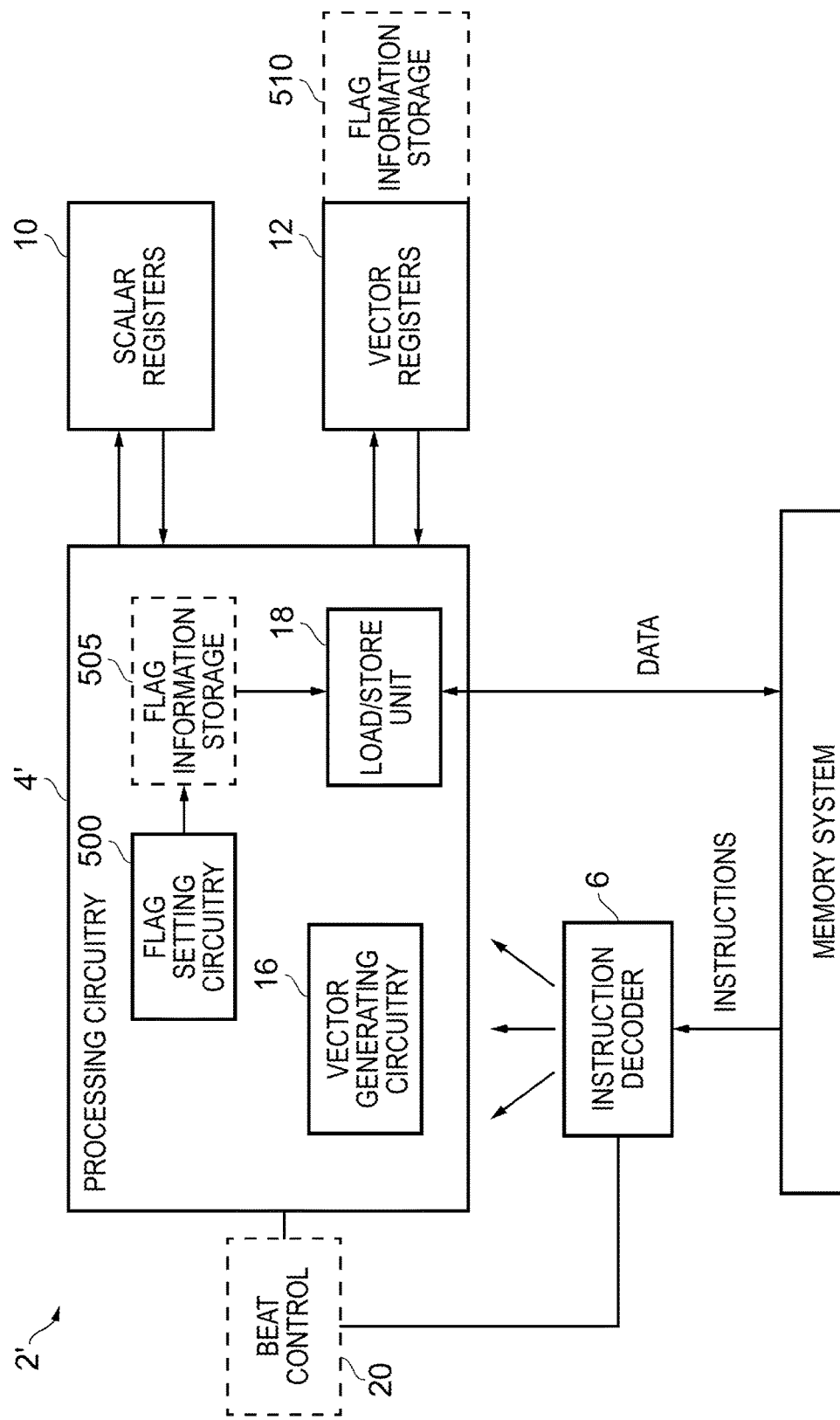
FIG. 12 is a block diagram of an apparatus in accordance with a further embodiment.

As will be described with reference to the remaining figures, certain embodiments can provide a mechanism for alleviating this problem. FIG. 12 schematically illustrates an example embodiment incorporating components aimed at identifying when certain sequences of addresses will be contiguous, hence assisting the load/store unit in reducing the number of accesses required in such situations. As will be seen from a comparison of FIG. 12 with FIG. 1, FIG. 12 illustrates an apparatus 2' which is essentially the apparatus 2 of FIG. 1, but with some additional components. In particular, the processing circuitry 4' includes all of the components provided within the processing circuitry 4 of FIG. 1, but in addition has flag setting circuitry 500 that can be arranged to set flag information on determination that a vector generated for storage in one of the vector registers 12 comprises a plurality of elements that meet specified contiguousness criteria. The flag information generated by the flag setting circuitry can be stored in a variety of locations. For example, a flag information storage 505 can be provided in association with the flag setting circuitry for storing the flag information. Alternatively, the flag information storage 510 can effectively be incorporated within the vector register file 12 by providing a number of additional bits in association with each vector register to capture the necessary flag information.

If for a particular vector register the flag setting circuitry 500 sets flag information to identify that at least a portion of that vector register has elements whose values meet specified contiguousness criteria, then when the load/store unit subsequently performs a gather or scatter operation using a vector of offsets that is specified with reference to that register, it can utilise the flag information to determine which address elements are contiguous, and hence potentially reduce the number of accesses to the memory system 8 required in order to perform the gather or scatter operation. In the absence of the flag information being set, then the load/store unit will handle the gather or scatter operation in the standard manner. This may involve requiring the load/store unit 18 to treat each address element as identifying a discontiguous address, and hence performing separate accesses for each address element. Alternatively, some other components may be provided within the memory access path to seek to at least partially optimise the accesses. To the extent that such additional circuitry is provided, it can be used in addition to the flag information mechanism described herein.

The specified contiguousness criteria that the flag setting circuitry 500 seeks to determine the presence or absence of can take a variety of forms, but in one embodiment requires at least a subset of the elements in the vector to have values that follow a regularly progressing sequence. The flag information is then set so as to enable the processing circuitry to determine which elements in the vector have values that follow the regularly progressing sequence.

Figure 13A:
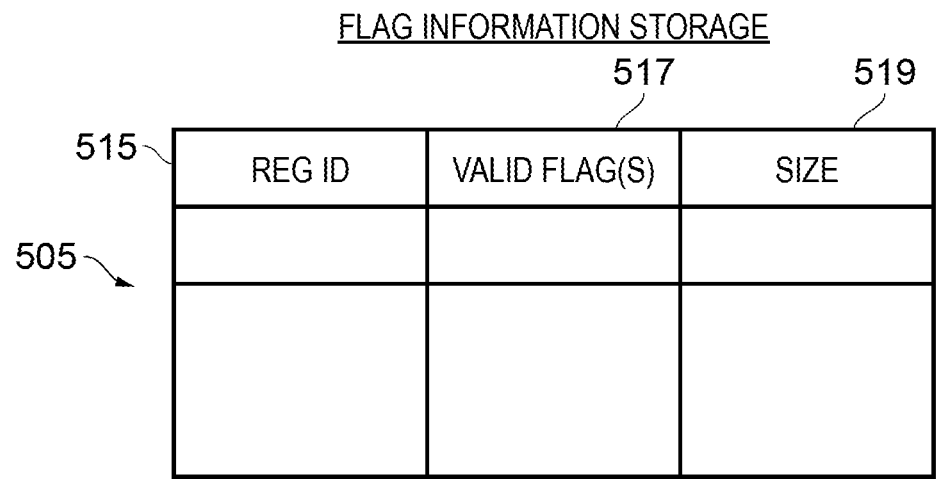
FIGS. 13A and 13B illustrate two example arrangements of the flag information storage shown in FIG. 12 in accordance with described embodiments.

FIG. 13A illustrates entries that may be provided within the flag information storage 505 in accordance with one embodiment. In this example, multiple entries are provided, each entry having a register ID field 515 to identify the register to which the entry relates, and a valid flag field 517 comprising one or more valid flags. In one embodiment, a single valid flag can be used in association with the entire vector, and will only be set if all of the elements in the vector follow the regularly progressing sequence. Alternatively, multiple valid flags may be provided within the valid flags field 517, each flag being associated with a different portion of the vector and being set dependent on whether the associated portion contains elements that follow a regularly progressing sequence. If desired, additional information can also be captured to identify whether the regularly progressing sequence extends between multiple portions. Hence, by way of example, if there are four valid flags relating to four portions in the vector, and the valid flags indicate that portions 2 and 3 both contain elements following the regularly progressing sequence, the flag information can additionally capture, if desired, whether the regularly progressing sequence in portion 3 is a non-interrupted continuation of the regularly progressing sequence in portion 2.

The regularly progressing sequence being looked for can take a variety of forms, but in one embodiment is such that contiguous memory addresses will result from the values that follow the regularly progressing sequence if those values are used as address elements for memory access operations. As discussed earlier, it may be that only a single data value size is supported, and hence the regularly progressing sequence will relate to values that identify consecutive addresses having regard to that data value size. However, in alternative embodiments multiple different data value sizes may be supported, and in that instance a size field 519 can be provided within each entry to identify the size of the data value to which the flag information relates. In particular, it will be appreciated that a sequence of values may be used to represent contiguous addresses when the data values are of one size, but that same sequence of values will not necessary represent contiguous addresses if the data values are of a different size.

As another example, it may be that the system supports multiple data value sizes, but that the flag setting mechanism of the described embodiments is only implemented in respect of data values of a particular size. For example, it may be decided to implement the flag setting technique when the data values being processed are byte sized data values, but not to implement the flag setting technique when the data values are of any larger size. In such instances, the size information field 519 may not be required.

Similarly, it may be that the use of the flag setting technique is limited to one or more particular vector registers, and each entry in the flag information storage may be directly associated with a particular register. In that event, it may not be necessary to provide the register identifier field 515.

In a further alternative embodiment, the flag information may be retained for only a single register, in particular to provide flag information for the last used vector. In such an embodiment, if the code is structured in a way that the instruction immediately preceding the memory access instruction generates a vector of elements that can represent consecutive offsets, then the implementation merely checks that the same vector is used as the offset register for the memory access instruction and then reads the flag information accordingly. Again, this avoids any specific need for a register identifier to be captured within the flag information.

Figure 13B:
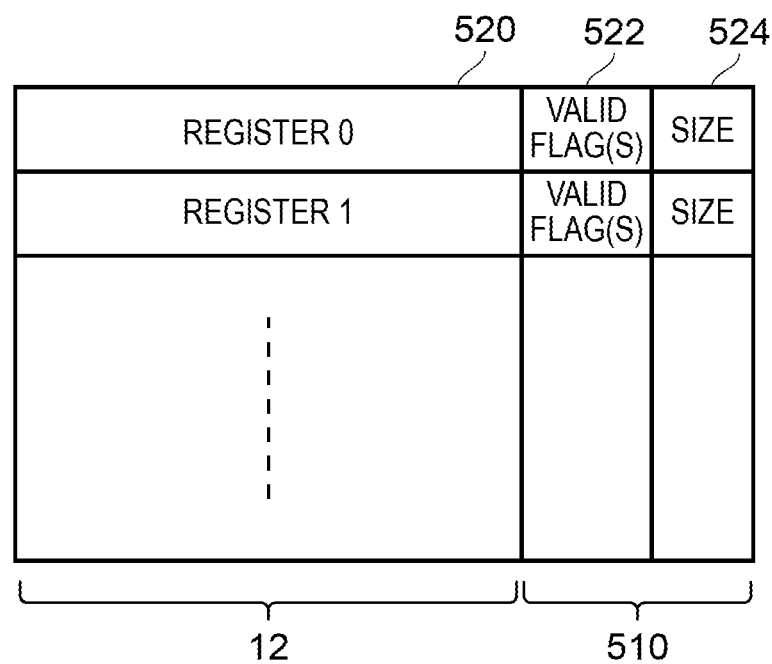

FIG. 13B illustrates an example arrangement of an alternative flag information storage 510 that is provided in combination with the vector registers of the vector register file 12. For each vector register 520, a corresponding valid flag field 522 could be provided to store the one or more valid flags associated with that register. A size information field 524 can also be provided if required. With such an approach, valid flag information can potentially be retained simultaneously for each of the vector registers in the vector register file 12.

Figure 14:
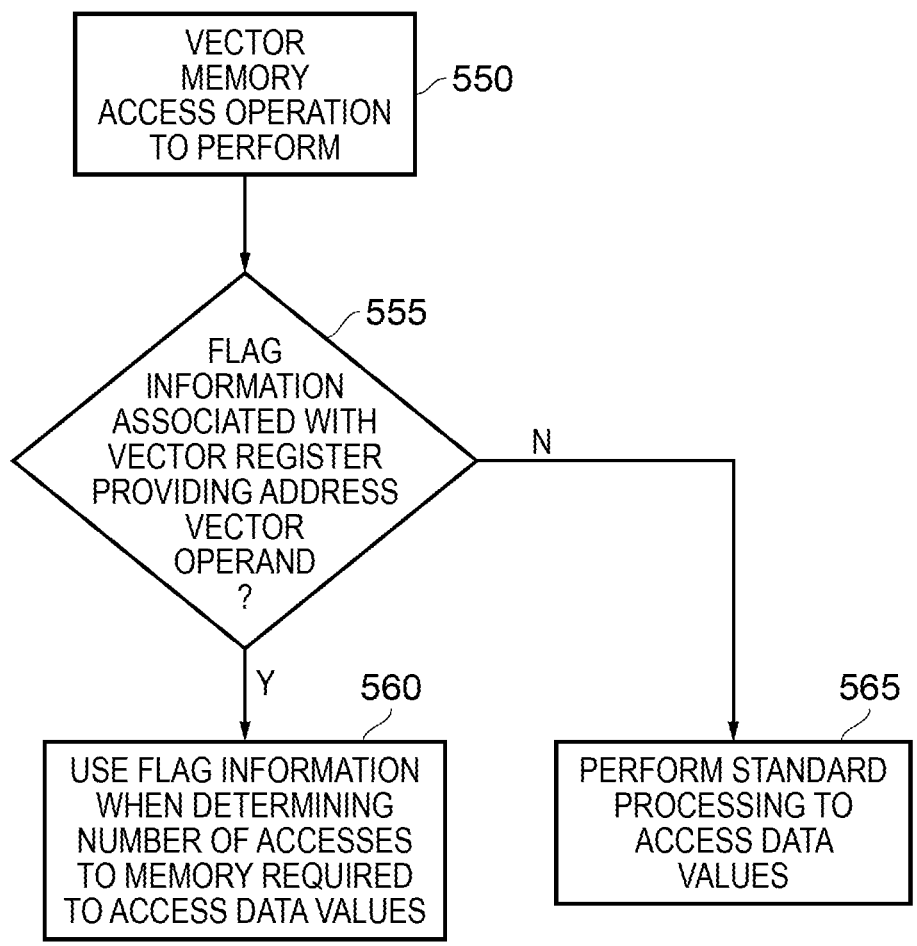
FIG. 14 is a flow diagram illustrating how the flag information may be used when executing vector memory access operations in accordance with one embodiment.

FIG. 14 is a flow diagram illustrating how the flag information is used when executing vector memory access operations. At step 550, it is determined that a vector memory access operation is to be performed. In particular, in one embodiment, at this point the load/store unit 18 determines that it has a vector memory gather or scatter operation to perform. For other types of vector load or store instructions that inherently identify contiguous addresses in memory, there is no need for the flag information, and those accesses can be handled in the standard way taking advantage of the known contiguous nature of the addresses. However, as mentioned earlier, for scatter or gather type operations, these may potentially be to arbitrary addresses in memory, but the presence of flag information in association with the vector register used to provide the address offset information can enable the load/store unit to determine whether any of the address elements do in fact relate to contiguous addresses, and to use that information to potentially reduce the number of accesses required.

Accordingly, at step 555, it is determined whether flag information is associated with the vector register that provides the address vector operand, in one embodiment this being the vector of address offsets that are then combined with a base address in order to identify the addresses to access. If flag information is associated with that vector register, then at step 560 the flag information is used by the load/store unit 18 when determining the number of accesses to memory required to access the data values. However, otherwise, the process proceeds to step 565 where the gather or scatter operation is performed in the standard manner in order to access the data values.

Figure 15A:
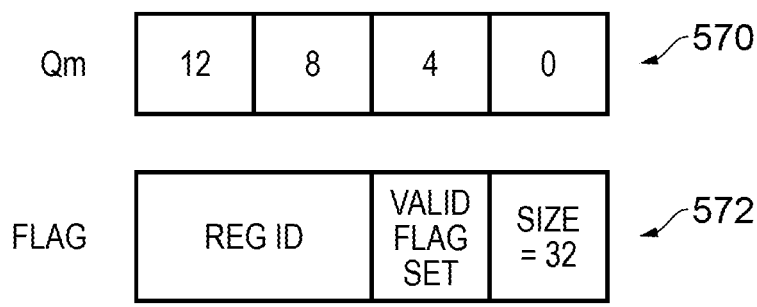
FIG. 15A to 15C illustrate different example arrangements of flag information that may be used in the described embodiments.
Figure 15B:
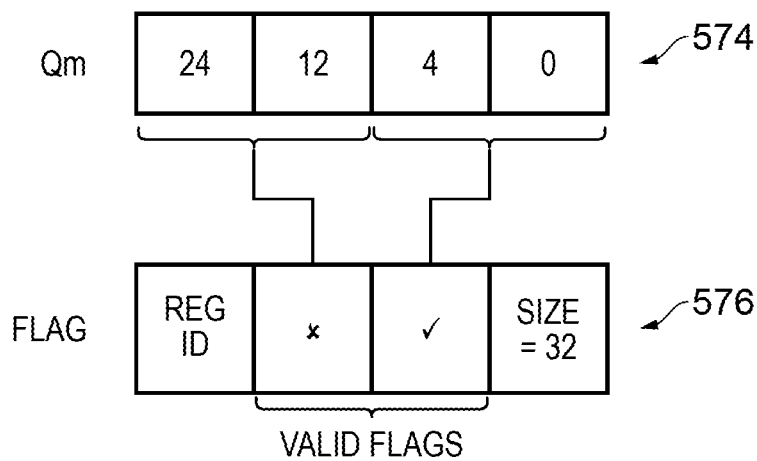
Figure 15C:
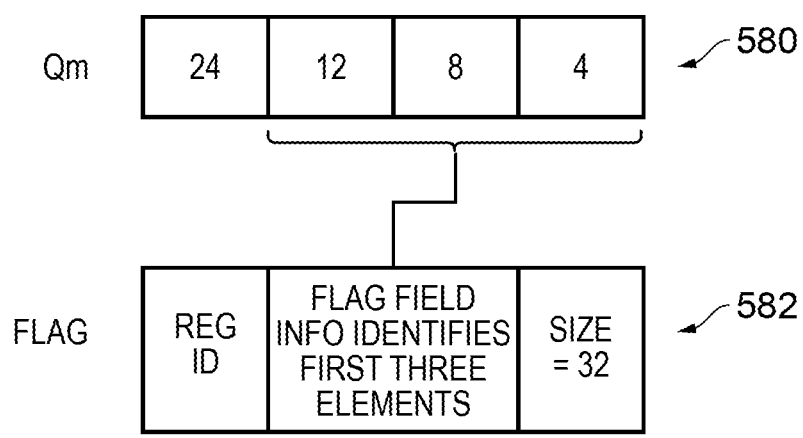

FIGS. 15A to 15C illustrate various examples for the offset values provided as an input to a vector load instruction specifying a vector gather operation. In this example, it is assumed that the vector load instruction is loading four 32-bit data values into a 128-bit destination register Qd, with the offset information being provided within the source vector register Qm, and the base address being specified in the scalar register Rn. In the example shown in FIG. 15A, it is assumed that the vector of offsets 570 provides a regularly increasing sequence of values which can be used to generate contiguous addresses for four 32-bit data values. Also in this example, it is assumed that the flag information 572 has a single valid flag which is set to identify that the regularly progressing sequence relates to the entire vector width. The size information field is also set to identify that the assumed data size is 32 bits, and the register ID field is set to identify that the flag information relates to the register Qm. Since the vector load instruction is operating on 32-bit quantities, then when the flag information is referred to, it is determined that the size information matches, and the register ID matches the source register Qm. Since the valid flag is set, the load/store unit hence knows that all of the address elements follow a regularly progressing sequence that will cause contiguous addresses in memory to be identified when combined with the base address.

How the load/store unit 18 uses the information will depend on a number of factors, including the memory access bandwidth available. For example, if a 64-bit memory access bandwidth is supported, then based on the information shown in FIG. 15A, the load/store unit can perform two 64-bit accesses, each directed to two contiguous addresses, hence enabling two data values to be retrieved by each access. If instead a 128-bit memory access bandwidth is supported, then the load/store unit 18 can perform one 128-bit access directed to four contiguous addresses in order to retrieve all four data values via a single access.

FIG. 15B illustrates a second example, where the flag information has two valid flags within the valid flag field, and accordingly the flag information takes the form 576 for the particular example vector of elements 574. Hence, in this example, if at least a 64-bit memory access is supported, the load/store unit can issue a single access in order to retrieve the first two data values. Separate accesses will then typically be needed to obtain the third data value and the fourth data value.

In the event that both valid flags are set, due to both the lower half and the upper half of the source vector register Qm containing elements following the required progressing sequence, then optionally some additional information can be captured to identify whether there is a continuity between the two halves. For example, if Qm held the elements 20, 16, 4, 0, both valid flags would be set, but this additional information would not be set, whereas if Qm held the values 12, 8, 4, 0, then both valid flags would be set, and in addition this further flag would be set to identify the continuity between the two halves. This can be useful in certain situations. For example, if the memory access path has a bandwidth of 128 bits, this additional information could be used to determine whether two 64-bit contiguous accesses needed to be issued, or whether a single 128-bit contiguous access could be issued.

FIG. 15C illustrates a yet further example where the source vector of offsets takes the form 580, and the flag information takes the form 582. In this instance, the flag information field does not simply contain a series of flags, but instead provides sufficient information to identify which of the elements represent contiguous addresses. In this example, the first three elements in the vector have the required pattern, and that information can be captured within the flag field. It will be appreciated that this could be captured in a variety of ways. For example a start element and an end element of contiguity could be identified, or a starting element for a contiguous sequence could be identified, along with a number of elements that are then contiguous.

Figure 16A:
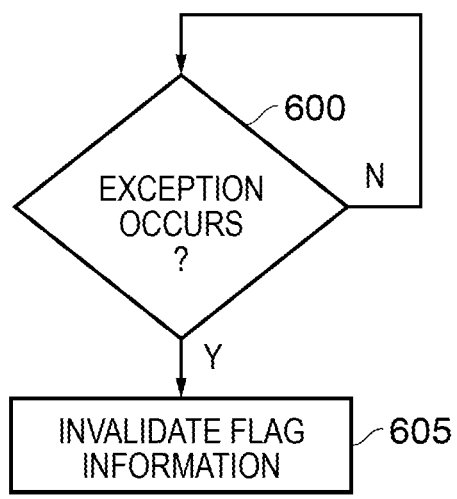
FIGS. 16A and 16B are flow diagrams indicating specified events that may cause the flag information to be invalidated in accordance with one embodiment.

In one embodiment, the flag setting circuitry 500 can be arranged to invalidate the flag information on occurrence of one or more specified events. In particular, in one embodiment as shown in FIG. 16A, if it is determined that an exception occurs at step 600, then the flag information is invalidated at step 605. Hence, an exception forms one of the specified events that causes the flag information to be invalidated.

Figure 16B:
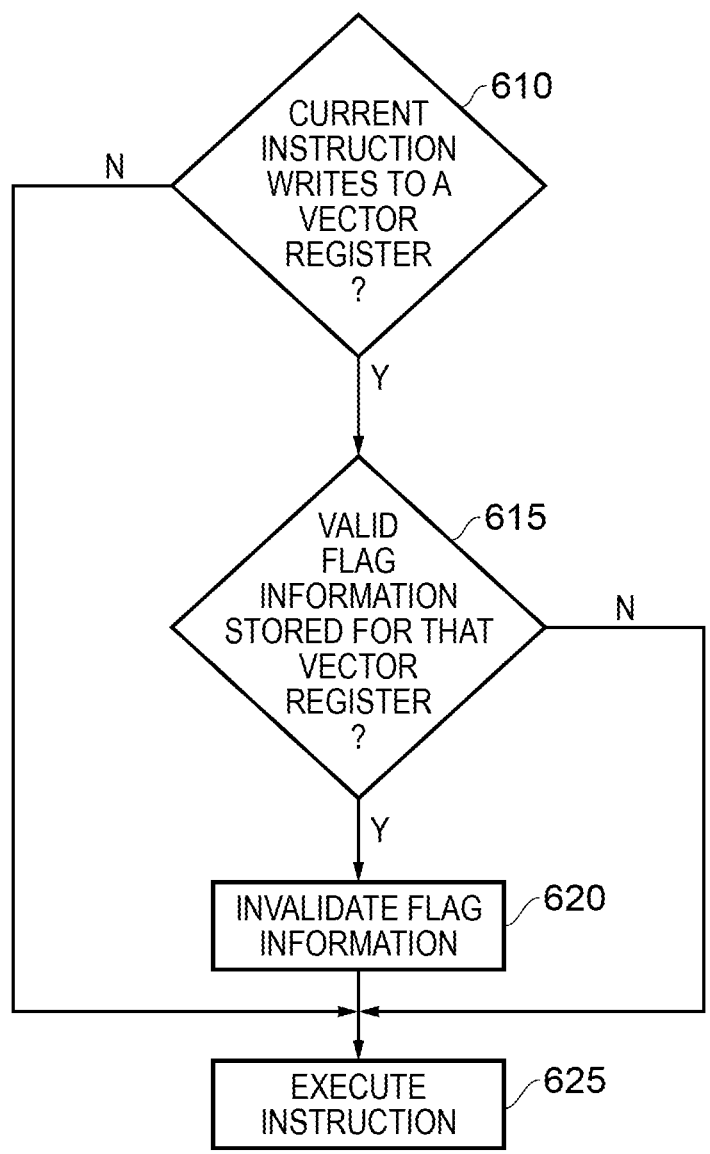

FIG. 16B illustrates another example of a specified event, in this instance the specified event being when the processing circuitry writes to a vector register that has flag information associated with it. Given that a write operation has occurred, the flag information can no longer be assumed to be accurate, and accordingly is invalidated. At step 610, it is determined whether the current instruction writes to a vector register, and if so at step 615 it is determined whether valid flag information is stored for that vector register. If it is, then the flag information for that vector register is invalidated at step 620. Thereafter at step 625 the instruction is executed. If the no path is followed from either step 610 or step 615 then the process proceeds directly to step 625 to execute the instruction, and any flag information is retained.

By arranging for the flag information to be invalidated on the occurrence of such events, this means that the flag information does not have to be architecturally visible, and so does not need to be saved and restored around exceptions. This simplifies the implementation of the flag setting mechanism.

Figure 17:
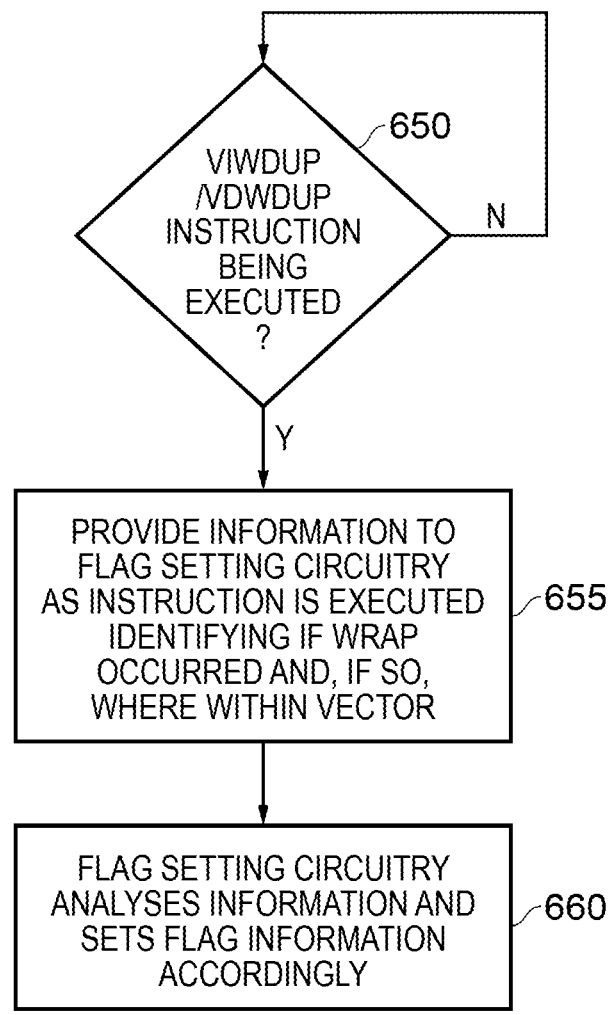
FIGS. 17 to 19 are flow diagrams illustrating different mechanisms that may be used to populate the flag information in accordance with the described embodiments.

There are a number of mechanisms that can be used to trigger the flag setting circuitry 500 to generate flag information for a vector of elements. FIG. 17 illustrates one example arrangement where the flag setting circuitry is triggered upon execution of one of the earlier-described VIWDUP or VDWDUP instructions. In particular, if at step 650 it is determined that one of these instructions is executed, then at step 655 whilst the vector generating circuitry 16 executes that instruction, it provides information to the flag setting circuitry 500 to identify if a wrap occurs within the vector generated and, if so, where that wrap occurred within the vector.

At step 660, the flag setting circuitry then analyses that information and sets the flag information accordingly for the relevant register. In particular, if no wrap occurs, then it is known that for the data value size identified for that VIWDUP or VDWDUP instruction, the vector of elements will represent contiguous addresses if that vector is used as an input to a subsequent gather or scatter operation relating to the same data value size, and accordingly the valid flag or valid flags can be set. Similarly, if there is a wrap point, it can still be determined which elements within the vector represent contiguous addresses, and the flag information can be set accordingly. In such instances, it will depend on the nature and granularity of the flag information that is being produced as to whether any valid flags can be set to identify at least portions of the vector that contain elements that relate to contiguous addresses.

Figure 18:
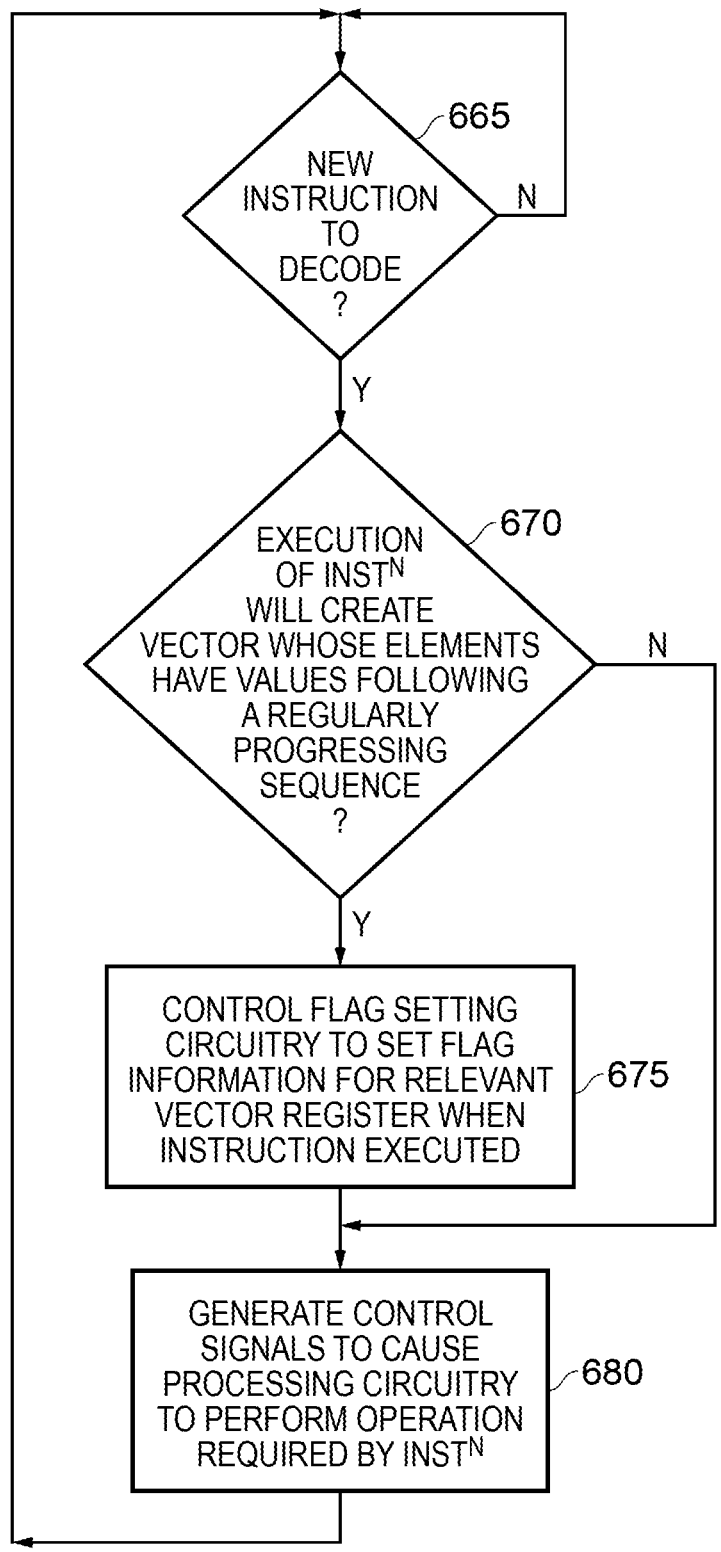

FIG. 18 illustrates another mechanism that can be used to invoke the flag setting circuitry 500, either instead of the approach of FIG. 17, or in addition to using the approach of FIG. 17. At step 665, it is determined whether there is a new instruction to decode, and if so the decoding circuitry determines at step 670 if execution of that instruction will create a vector whose elements have values following a regularly progressing sequence. For example, there may be certain instructions that it is known will create a regularly progressing sequence when they are executed, that could be used to represent address offsets for contiguous addresses for a particular data value size. If such a determination is made at step 670, then at step 675 the decoder circuitry sends a control signal to the flag setting circuitry to cause the flag setting circuitry to set the flag information for the relevant vector register when that instruction is subsequently executed within the processing circuitry 4'. In addition, at step 680, control signals are generated to cause the processing circuitry to perform the operation required by the instruction, prior to the process returning to step 665. If at step 670 it is determined that execution of the instruction will not be guaranteed to create a vector whose elements have values following a regularly progressing sequence, then the process proceeds directly to step 680, bypassing step 675.

Figure 19:
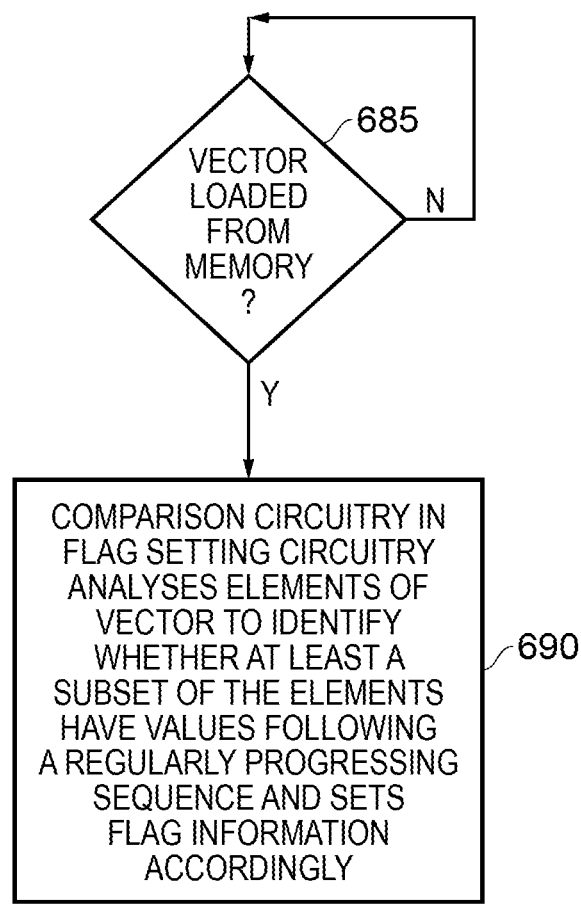

FIG. 19 illustrates a yet further mechanism that could be used to invoke the flag setting circuitry, either instead of, or in addition to, the mechanisms discussed in FIGS. 17 and 18. In this example, it is determined at step 685 whether a vector has been loaded from memory. When it is determined that a vector has been loaded from memory into one of the vector registers, then comparison circuitry within the flag setting circuitry can be invoked at step 690 to analyse the elements of the vector to identify whether at least a subset of the elements have values following a regularly progressing sequence (this can be analysed for a variety of different possible data value sizes). The flag information can then be set accordingly as a result of the analysis performed by the flag setting circuitry. It will be appreciated that the comparison operations identified in FIG. 19 can be performed by circuitry that is not on the critical access path to memory, and at a convenient point in the operation of the system which will not impact on the performance of the processing circuitry. Once the flag information has been generated, then if that vector is subsequently used as an input vector of address offsets for a gather or scatter operation, the flag information could be referred to in order to potentially reduce the number of accesses to memory required to process the gather or scatter operation.

The following code sequence illustrates an example of how the flag setting mechanism can improve performance:

| VIWDUP.8 | q7, r0, r2, #1 | // q0 = [0,1,2,...,15] |
|---|---|---|
| VLDRW.8 | q1, [%[basePtr], q7] | |

Execution of the VIWDUP instruction creates a monotonically incrementing vector value, with only rare cases where this wraps. In one example implementation, the flag setting circuitry could set a flag per word (i.e. 32 bits), stating that all elements within that word are monotonically incrementing. When the vector load instruction is then subsequently executed these flags can be read, and instead of processing the gather load normally, a contiguous load could be issued instead wherever these flags indicate consecutive elements.

Figure 20:
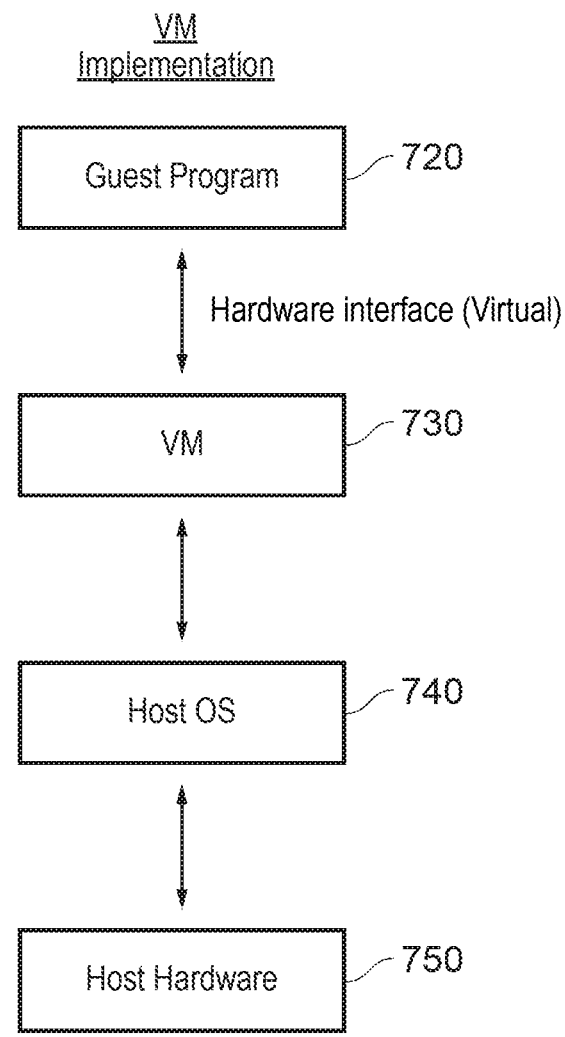
FIG. 20 shows a virtual machine implementation which can be used.

FIG. 20 illustrates a virtual machine implementation that may be used. Whilst the earlier described embodiments implement the present technique in terms of apparatus and methods for operating specific processing hardware supporting the techniques concerned, it is also possible to provide so-called virtual machine implementations of hardware devices. These virtual machine implementations run on a host processor 750 running a host operating system 740 supporting a virtual machine program 730. Typically, large powerful processors are required to provide virtual machine implementations which execute at a reasonable speed, but such an approach may be justified in certain circumstances, such as when there is a desire to run code native to another processor for compatibility or re-use reasons. The virtual machine program 730 provides a virtual hardware interface to an guest program 720 which is the same as the hardware interface which would be provided by the real hardware which is the device being modelled by the virtual machine program 730. Thus, the program instructions, including those used to control memory accesses described above, may be executed from within the guest program 720 using the virtual machine program 730 to model their interaction with the virtual machine hardware. The guest program 720 may be a bare metal program, or alternatively it may be a guest operating system that runs applications in a similar way to how Host OS 740 runs the virtual machine application 730. It will also be appreciated that there are different types of virtual machine, and in some types the virtual machine runs directly on the host hardware 750 without the need for a host OS 740.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. A data processing apparatus comprising:
a set of vector registers;
flag setting circuitry, responsive to a determination that a vector generated for storage in a vector register of said set comprises a plurality of elements that meet specified contiguousness criteria, to generate flag information associated with that vector register; and
processing circuitry to perform a vector memory access operation in order to access in memory a plurality of data values at addresses determined from an address vector operand comprising a plurality of address elements, said address vector operand being provided in a specified vector register of said set, and the plurality of elements of the vector stored in said specified vector register forming said plurality of address elements;
the processing circuitry being arranged to determine whether said specified vector register has flag information associated therewith and, when the first vector register does have flag information associated therewith, to use the flag information when determining a number of accesses to memory required to access the plurality of data values.

2. A data processing apparatus as claimed in claim 1, wherein, when said specified vector register has flag information associated therewith, the processing circuitry is arranged to access multiple of the data values via a single access to contiguous addresses in the memory.

3. A data processing apparatus as claimed in claim 2, wherein, in the absence of said flag information being associated with the specified vector register, the processing circuitry is arranged to treat each data value as having a discontiguous address in the memory when determining the number of accesses to memory required to access the plurality of data values.

4. A data processing apparatus as claimed in claim 1, wherein the specified contiguousness criteria requires at least a subset of the elements in the vector to have values that follow a regularly progressing sequence, and the flag information enables the processing circuitry to determine which elements in the vector have values that follow the regularly progressing sequence.

5. A data processing apparatus as claimed in claim 4, wherein the flag information comprises at least one valid flag, each valid flag associated with a portion of the vector, and each valid flag being set when the elements within the associated portion of the vector have values that follow the regularly progressing sequence.

6. A data processing apparatus as claimed in claim 5, wherein the flag information further identifies, when multiple adjacent portions of the vector have their valid flags set, whether there is a continuity in the regularly progressing sequence between the multiple adjacent portions.

7. A data processing apparatus as claimed in claim 5, wherein the specified contiguousness criteria requires all of the elements in the vector to have values that follow the regularly progressing sequence, and the flag information comprises a valid flag set when all of the elements in the vector have values that follow the regularly progressing sequence.

8. A data processing apparatus as claimed in claim 4, wherein the flag information comprises size information identifying a data value size for which the elements in the vector having values that follow the regularly progressing sequence will generate contiguous addresses in memory when those elements are used as the address elements for the vector memory access operation.

9. A data processing apparatus as claimed in claim 1, further comprising a control storage in which the flag information is stored for reference by the processing circuitry.

10. A data processing apparatus as claimed in claim 9, wherein the flag information includes a register identifier field whose value indicates the vector register to which that flag information relates.

11. A data processing apparatus as claimed in claim 9, wherein the control storage has multiple entries to enable flag information for multiple vector registers to be maintained.

12. A data processing apparatus as claimed in claim 1, wherein each vector register includes a control storage element for storage of the flag information for that vector register.

13. A data processing apparatus as claimed in claim 1, wherein the flag setting circuitry is arranged to invalidate the flag information on occurrence of a specified event.

14. A data processing apparatus as claimed in claim 13, wherein said specified event is considered to occur when at least one of:
an exception event occurs;
the processing circuitry performs an operation which writes to the vector register with which the flag information is associated.

15. A data processing apparatus as claimed in claim 1, further comprising decoder circuitry to decode instructions in order to control the operations performed by the processing circuitry, the decoder circuitry being responsive to decoding a vector generating instruction of a type that is known will cause the processing circuitry to generate a vector comprising a plurality of elements whose values follow a regularly progressing sequence, to generate control signals to cause the flag setting circuitry to generate the flag information in association with the vector generated by the processing circuitry.

16. A data processing apparatus as claimed in claim 1, wherein:

the processing circuitry is arranged, responsive to a vector generating instruction identifying a scalar start value and wrapping control information, to generate a vector comprising a plurality of elements, the processing circuitry being arranged to generate the vector such that the first element in said plurality is dependent on the scalar start value, and the values of the plurality of elements follow a regularly progressing sequence that is constrained to wrap as required to ensure that each value is within bounds determined from the wrapping control information; and when generating the vector the processing circuitry is arranged to provide information to the flag setting circuitry to enable the flag setting circuitry to determine whether to generate the flag information.

17. A data processing apparatus as claimed in claim 1, wherein the flag setting circuitry comprises comparison circuitry to analyse the elements of a vector generated for storage in a vector register in order to determine whether at least a subset of the elements in the vector have values that follow a regularly progressing sequence, and to generate the flag information in dependence on that analysis.

18. A method of controlling vector memory accesses in a data processing apparatus having a set of vector registers, comprising:

determining whether a vector generated for storage in a vector register of said set comprises a plurality of elements that meet specified contiguousness criteria;

generating, in response to determining that said vector does comprise a plurality of elements that meet the specified contiguousness criteria, flag information associated with said vector register;

performing a vector memory access operation in order to access in memory a plurality of data values at addresses determined from an address vector operand comprising a plurality of address elements, said address vector operand being provided in a specified vector register of said set, and the plurality of elements of the vector stored in said specified vector register forming said plurality of address elements; and when performing the memory access operation, determining whether said specified vector register has flag information associated therewith and, when the first vector register does have flag information associated therewith, using the flag information when determining a number of accesses to memory required to access the plurality of data values.

\* \* \* \* \*